(12) United States Patent
Taguchi et al.

(10) Patent No.: US 11,597,548 B2
(45) Date of Patent: Mar. 7, 2023

(54) BINDING MACHINE

(71) Applicant: MAX CO., LTD., Tokyo (JP)

(72) Inventors: Satoshi Taguchi, Tokyo (JP); Hiroki Uchiyama, Tokyo (JP)

(73) Assignee: MAX CO., LTD., Tokyo (JP)

( * ) Notice: Subject to any disclaimer, the term of this patent is extended or adjusted under 35 U.S.C. 154(b) by 262 days.

(21) Appl. No.: 16/997,008

(22) Filed: Aug. 19, 2020

(65) Prior Publication Data
US 2021/0053708 A1 Feb. 25, 2021

(30) Foreign Application Priority Data

Aug. 23, 2019 (JP) .............................. JP2019-153291
Mar. 25, 2020 (JP) .............................. JP2020-055110

(51) Int. Cl.
| B65B 13/34 | (2006.01) |
| B32B 37/00 | (2006.01) |
| B32B 37/12 | (2006.01) |
| B65B 13/02 | (2006.01) |
| B65B 13/04 | (2006.01) |
| B32B 38/00 | (2006.01) |

(52) U.S. Cl.
CPC ........ *B65B 13/345* (2013.01); *B32B 37/0046* (2013.01); *B32B 37/1292* (2013.01); *B65B 13/025* (2013.01); *B65B 13/04* (2013.01); *B32B 2038/0052* (2013.01)

(58) Field of Classification Search
CPC ..... B65B 13/345; B65B 13/025; B65B 13/04; B32B 37/0046; B32B 37/1292; B32B 2038/0052; B25C 5/0285; A01G 17/08
See application file for complete search history.

(56) References Cited

U.S. PATENT DOCUMENTS

| 9,669,530 | B2 | 6/2017 | Chen et al. |
| 2015/0048138 | A1* | 2/2015 | Chen ..................... B25C 5/06 |
| | | | 227/109 |
| 2015/0181810 | A1 | 7/2015 | Cho |
| 2017/0361959 | A1* | 12/2017 | Ishiguro ............... A01G 17/085 |

FOREIGN PATENT DOCUMENTS

| EP | 3257358 A1 | 12/2017 |
| JP | 2017-222403 A | 12/2017 |
| WO | 2009-031665 A1 | 3/2009 |

OTHER PUBLICATIONS

The Extended European Search Report for European Application No. 20191996.6-1011, dated Jan. 19, 2021, (8 pages).

* cited by examiner

*Primary Examiner* — Michael N Orlando
*Assistant Examiner* — Christopher W Raimund
(74) *Attorney, Agent, or Firm* — Weihrouch IP

(57) ABSTRACT

A binding machine, includes a staple guide portion adjacent to a staple in a staple accommodating portion. A staple driver moves from below to above and pushes the staple located at the front end portion upward while pushing the crown portion of the staple. A clincher abuts against the pair of leg portions of the staple pushed out in a process of the staple driver moving upward from below so as to fold the pair of leg portions. The staple guide supports the crown portion of the staple from a side near a base end portion of the crown portion in a process of the staple being pushed out.

21 Claims, 27 Drawing Sheets

BINDING MACHINE

CROSS REFERENCE TO RELATED APPLICATIONS

This application claims priority to Japanese Patent Application No. 2019-153291 filed on Aug. 23, 2019 and Japanese Patent Application No. 2020-055110 filed on Mar. 25, 2020, the contents of which are incorporated herein by reference.

TECHNICAL FIELD

The present invention relates to a binding machine.

BACKGROUND ART

A horticultural binding machine has been used for binding work during cultivating of agricultural crops. For example, in cultivating of agricultural crops such as sesames, grapes, tomatoes, pears, and plums, a horticultural binding machine is used in order to bind vines and stems of plants to struts and nets. The binding machine strikes a staple from a staple magazine unit to fix ends of a binding tape.

Since a binding machine described in JP-A-2017-222403 has an structure in which a staple magazine body 62 and an ejection port 62A are integral, so that a dimensional change of the ejection port 62A can be prevented, which in turn prevent problems such as staple jamming and double-staple striking.

However, the problems such as staple jamming may occur due to other reasons. For example, at a time of performing a binding method, which is called "end fixing", for tightly fixing a loop of a binding tape to firmly fix branches and number wires, a problem such as the staple jamming may occur.

When the binding tape is cut in a state where a strong tension is applied due to the end fixing, the binding tape moves to a front where the cutting blade is located. As the binding tape moves forward, a staple that is to be advanced directly above the staple driver is pulled forward and fall down, and as a result, a problem such as staple jamming may occur in which the staple is caught between a clincher and the staple driver.

SUMMARY OF INVENTION

Embodiments of the present invention provide a binding machine capable of preventing a staple from falling over at a time of staple striking.

According to an aspect of the present invention, a binding machine, includes: a staple accommodating portion including a base end portion and a front end portion on an opposite side of the staple accommodating portion from the base end portion, the staple accommodating portion being configured to accommodate a U-shaped staple including a crown portion and a pair of leg portions at least at the front end portion with the crown portion facing downward; a staple driver located below the front end portion of the staple accommodating portion, movable relative to the staple accommodating portion from below to above in the staple accommodating portion, and configured to push the staple located at the front end portion upward while pushing the crown portion of the staple; a clincher provided at a position above the front end portion of the staple accommodating portion and facing the staple driver, and configured to be abutted against the pair of leg portions of the staple pushed out in a process of the staple driver moving upward from below so as to fold the pair of leg portions; and a staple guide portion adjacent to the staple in the staple accommodating portion and configured to support the crown portion of the staple from a side near the base end portion of the crown portion in a process of the staple being pushed out.

DESCRIPTION OF EMBODIMENTS

DESCRIPTION OF EMBODIMENTS

Figure 1:
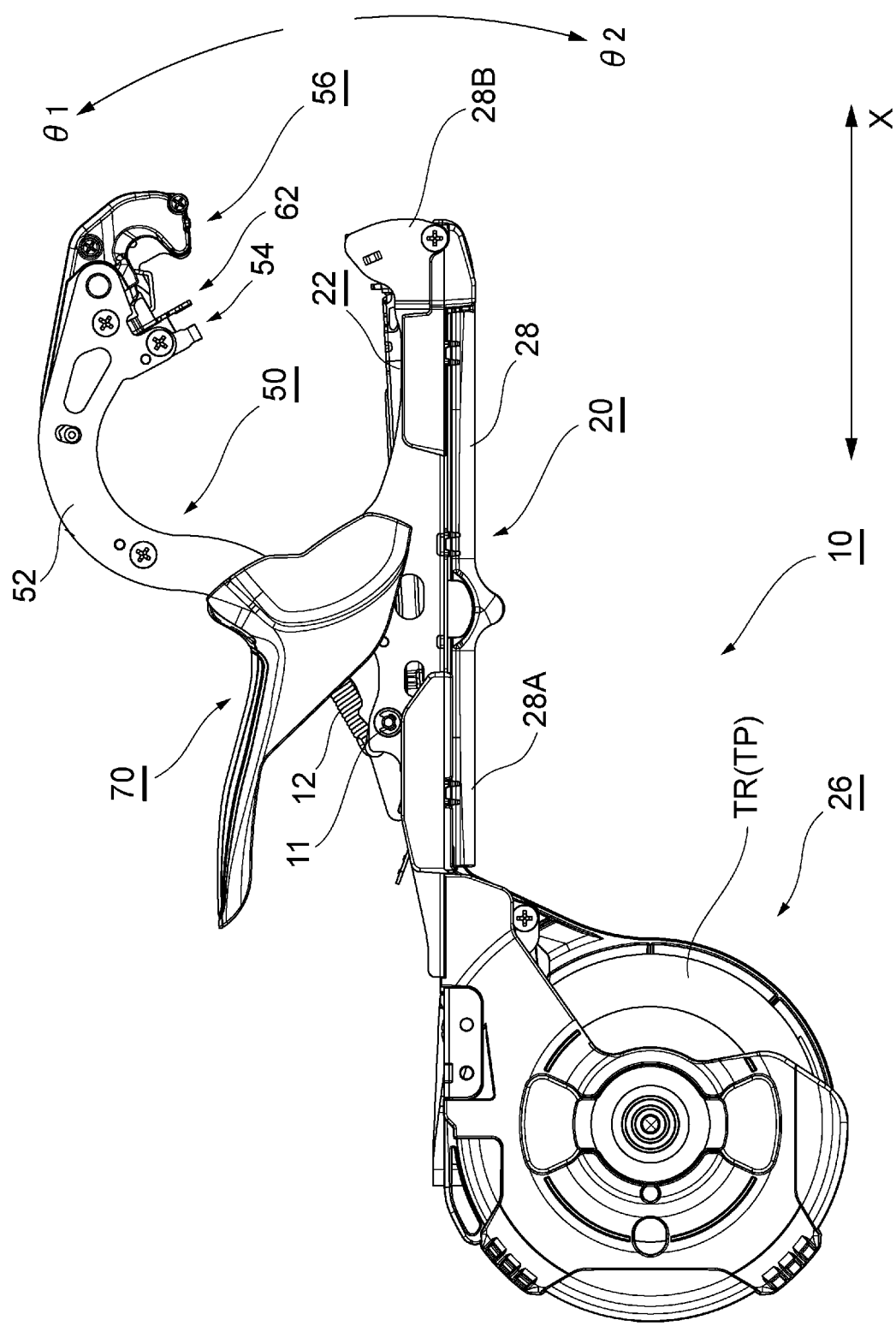
FIG. 1 is a right side view showing an example of a binding machine according to an embodiment of the present invention.
Figure 2:
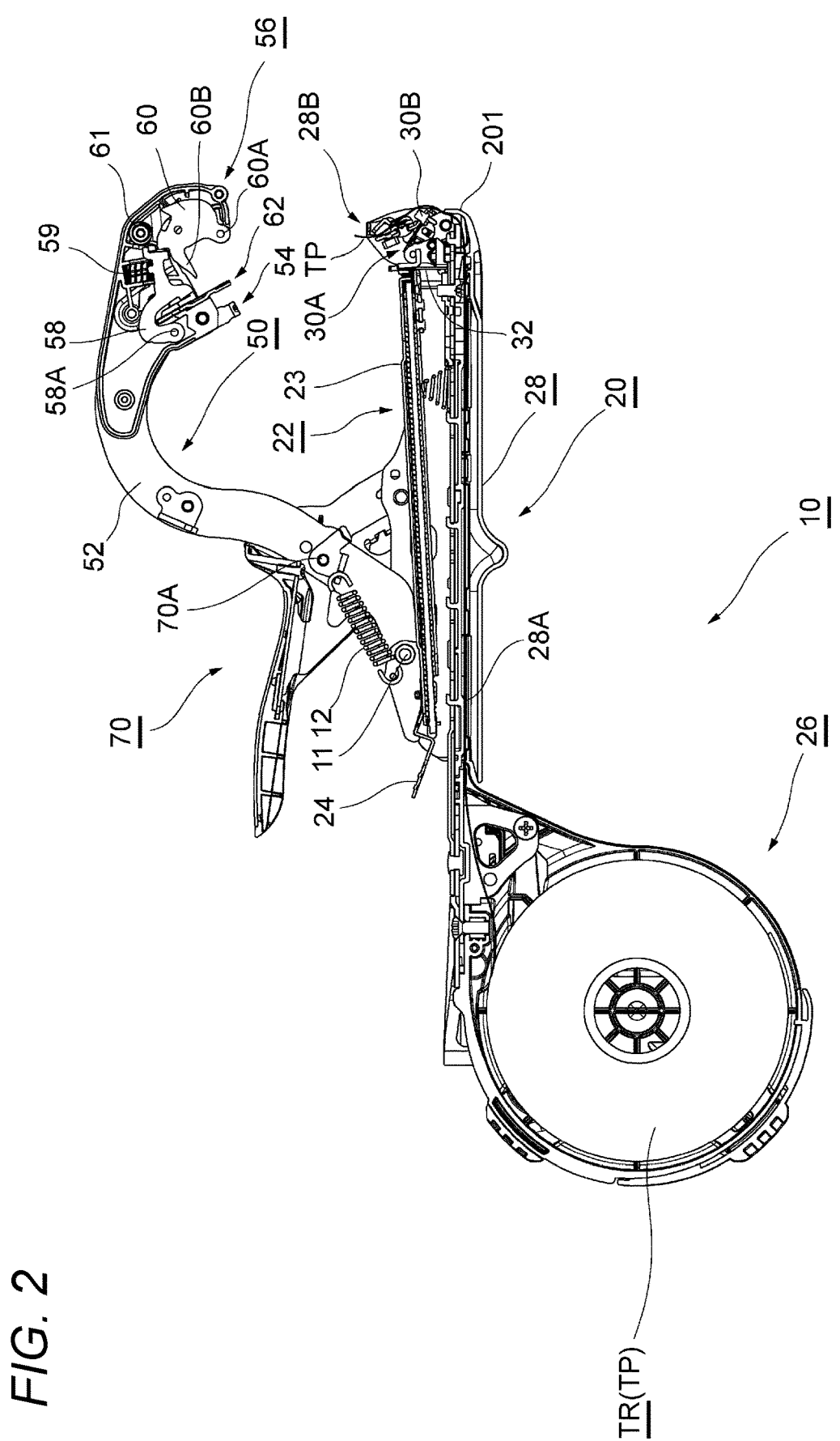
FIG. 2 is a cross-sectional view of the binding machine in a standby state.

Hereinafter, embodiments of the present invention will be described with reference to the drawings. The following embodiments are examples for illustrating the present invention and the present invention is not intended to be limited to those embodiments. FIG. 1 is a right side view of a binding machine 10 for gardening according to the present embodiment. FIG. 2 is a cross-sectional view of the binding machine 10 in FIG. 1.

In the present embodiment, for convenience, a side (a right side in FIG. 1) toward which a tape holder 28A extends from a tape magazine unit 26 in which the tape TP for binding is accommodated, heading for a tape guide 28B provided at a distal end of a binding machine 10 from which the tape TP is pulled out, may be referred to as a "front side", and an opposite side (a left side in FIG. 1) may be referred to as a "rear side".

Further, a side (upper side in FIG. 1) toward which the tape TP is pulled out from the tape guide 28B, heading for a tape holding unit 56 in a standby state, may be referred to as an "upper side", and an opposite side (lower side in FIG. 1) may be referred to as a "lower side". Hereinafter, a main configuration of the binding machine 10 will be outlined below. Thereafter, a characteristic structure of the binding machine 10 will be described in detail.

The binding machine 10 for gardening according to the present embodiment can be used, for example, in attraction binding operations on an agricultural crop (an example of an "object S to be bound"). The binding machine 10 includes a main handle 20, a staple magazine unit 22 rotatably attached to the main handle 20, a clincher arm 50 rotatably attached to the main handle 20, and an operation handle 70 rotatably attached to the clincher arm 50.

The main handle 20 is a member formed in an elongated linear shape. The main handle 20 includes a tape transport unit 28, a tape cutting unit 30, and a staple driver 32. A tape magazine unit 26 is attached to a rear end portion of the main handle 20. The main handle 20 and the tape magazine unit 26 may be integrally formed.

The tape magazine unit 26 is a mechanism that accommodates the tape TP wound on a reel (hereinafter, the wound tape TP may be referred to as a tape reel TR (an example of a "wound binding tape")). As illustrated in FIG. 1 and the like, the tape magazine unit 26 is provided at the rear end portion of the main handle 20.

The tape transport unit 28 includes the tape holder 28A and the tape guide 28B. The tape holder 28A is a path for transporting the tape TP from the tape magazine unit 26 to the tape guide 28B, and is laid along a longitudinal direction X of the main handle 20. The tape holder 28A includes a bottom portion facing one surface of the tape TP, and a lid portion facing the other surface of the tape TP (hereinafter, the other surface of the tape TP may be referred to as a "back surface"). The bottom portion and the lid portion are configured to be openable and closable with one side along the longitudinal direction X as a fulcrum, for example.

The tape guide 28B (see FIGS. 2 to 8) is a member that guides a tip of the tape TP upward from the tape holder 28A. The tape guide 28B is rotatably provided at a front end portion of the tape holder 28A. The tape guide 28B has wall surfaces facing at least a part of each of a front surface, a back surface, and both side portions of the tape TP, so as for the inserted tape TP not to come off easily.

The tape cutting unit 30 includes a cutting blade 30A that cuts the tape TP, and a lock mechanism 30B that locks and unlocks the cutting blade 30A. During replacement of the cutting blade 30A, the lock mechanism 30B releases locking of the cutting blade 30A and the cutting blade 30A is removed. The cutting blade 30A is provided rotatably and integrally with the tape guide 28B, and is biased by an elastic member (not illustrated) so as to face the rear side during a standby state and a holding operation. When performing a binding operation, the tape guide 28B is pressed against a tip portion 60B of a tape catch 60, the tape guide 28B and the cutting blade 30A rotate against a biasing force of the elastic member (not illustrated), and a tip portion of a blade edge of the cutting blade 30A moves so as to face the tape TP.

As a mechanism that cuts the tape TP, various mechanisms can be employed. For example, the tape TP may be rotated in conjunction with the tape guide 28B, thereby cutting the tape TP; the tape guide 28B and the cutting blade 30A may be configured to be movable in a straight advancing direction and the cutting blade 30A may be moved in a linear direction, thereby cutting the tape TP; and a member restraining the tape TP such as the tape guide 28B may be moved so as to cause the tape TP to be cut by the stationary cutting blade 30A.

The staple driver 32 is a plate that is attached to the main handle 20 so as to face a vicinity of a front end of a staple accommodating portion 23 of the staple magazine unit 22. The staple driver 32 is formed to have a thickness, for example, substantially the same as a width of a staple ST or smaller than the width of the staple ST so as to drive only one staple ST.

When the clincher arm 50 to be described below rotates in a closing direction with respect to the main handle 20, the staple magazine unit 22 is pressed by the clincher arm 50 to rotate in a direction of approaching the main handle 20. Therefore, an upper end of the staple driver 32 attached to the main handle 20 relatively enters a space in the staple accommodating portion 23 to drive a leading staple ST in the staple accommodating portion 23 upward. A configuration of the staple driver 32 will be described in detail later.

The driven staple ST is clinched by a clincher 54 after penetrating the tape TP. Two overlapped tapes TP can be held between bent leg portions of the staple ST and a crown portion 100 of the staple ST.

The staple magazine unit 22 is a member formed in an elongated linear shape. A rear end portion of the staple magazine unit 22 is attached to the rear end portion of the main handle 20 so as to be rotatable around a rotation shaft. However, since a rotation angle thereof is small, the staple magazine unit 22 may be expressed as being swingably attached to the main handle 20.

The staple magazine unit 22 includes the staple accommodating portion 23 that accommodates the staple ST, and a pusher unit 24. The staple accommodating portion 23 is disposed along the longitudinal direction X of the main handle 20. In order to accommodate the staple ST therein, the staple accommodating portion 23 includes a bottom surface formed to be elongated along the longitudinal direction X of the main handle 20, two sidewall surfaces standing from the bottom surface and facing each other, and a front wall surface against which a side surface of the leading staple ST is pressed. A configuration of the staple magazine unit 22 will be described in detail later.

In the staple accommodating portion 23, a plurality of staples ST can be accommodated. Adjacent staples ST can be connected to each other with an adhesive, for example, to form a column of a staple group as a whole.

The pusher unit 24 is, for example, a member removably attached to the staple accommodating portion 23 in order to push the staples ST accommodated in the staple accommodating portion 23 forward. The pusher unit 24 includes a compression spring that pushes staples ST at the rear end among the plurality of staples ST forward, and a cover that covers the staple accommodating portion 23 from above. By pulling out the pusher unit 24 from the staple accommodating portion 23 and opening the staple accommodating portion 23 to above, the staples ST can be set in the staple accommodating portion 23 from above.

The clincher arm 50 is attached by a rotation shaft portion 11 provided in a vicinity of a rear end portion so as to be rotatable with respect to the main handle 20, and is biased by a tension spring 12 in a direction in which an angle between the clincher arm 50 and the main handle 20 increases (a direction θ1 in which the clincher arm 50 opens). The clincher arm 50 includes an arm portion 52, the clincher 54, and the tape holding unit 56 (an example of a "holding unit"). The arm portion 52 has a shape that extends in a curved manner up to a tip portion so that a C-shaped opening can be formed between the arm portion 52 and the main handle 20.

The clincher 54 is a member that bends and clinches the leg portions of the staple ST. The clincher 54 is provided at a tip portion of the clincher arm 50 so as to face a tip of the staple driver 32 when the clincher arm 50 rotates in the closing direction θ2.

With such a configuration, the portions of the staple ST driven by the staple driver 32 are clinched by the clincher 54 and bent inward. The configuration including the clincher 54 that is provided on the clincher arm 50 and that is for performing binding processing may be referred to as a "binding portion". A configuration of the clincher 54 will be described in detail later.

The tape holding unit 56 is a mechanism that holds an end portion of the tape TP pulled out from the tape guide 28B at a tip of the main handle 20. The tape holding unit 56 is provided at a tip of the arm portion 52 of the clincher arm 50. The tape holding unit 56 includes a lock plate 58, the tape catch 60, and a tape plate 62.

The lock plate 58 is configured to be rotatable with a shaft portion 58A provided at one end portion thereof serving as a fulcrum, and the other end portion thereof is biased toward the tape catch 60 by a coil spring 59. The lock plate 58 locks the tape catch 60 by engaging with the tape catch 60 under the biasing of the coil spring 59, and can fix the tape catch 60 at a position separated from the tape plate 62.

The tape catch 60 is provided so as to be rotatable with a shaft portion 60A serving as a fulcrum, and is biased toward the tape plate 62 by a torsion coil spring 61. The tape catch 60 is configured such that, when locking by the lock plate 58 is released at the time of pulling out of the tape, the tip portion 60B having a tapered shape is moved toward the tape plate 62 under the biasing of the torsion coil spring 61.

The tape plate 62 is disposed to face the tape catch 60, and a tip portion thereof extends from the lock plate 58 toward the tape cutting unit 30. The extended portion of the tape plate 62 and the tip portion 60B of the tape catch 60 clamp the tape TP. When a user reduces a force of gripping the operation handle 70 while the tape TP is being held, the clincher arm 50 is rotated in the opening direction by the tension spring 12, and thus the tape TP can be pulled upward via the tape guide 28B.

The operation handle 70 is a portion to be gripped by the user. A shaft portion 70A at a substantially intermediate part thereof is rotatably attached to the clincher arm 50, and a front end portion of the operation handle 70 is attached to the main handle 20. With such a configuration, the clincher arm 50 is configured to be openable and closable relative to the main handle 20 according to an opening/closing operation of the operation handle 70, based on a principle of leverage using a portion to be gripped by a user as a force application point, a rotation shaft of the clincher arm 50 as a fulcrum, and the front end portion attached to the main handle 20 as an action point.

[Operation of Binding Machine 10]

Figure 3:
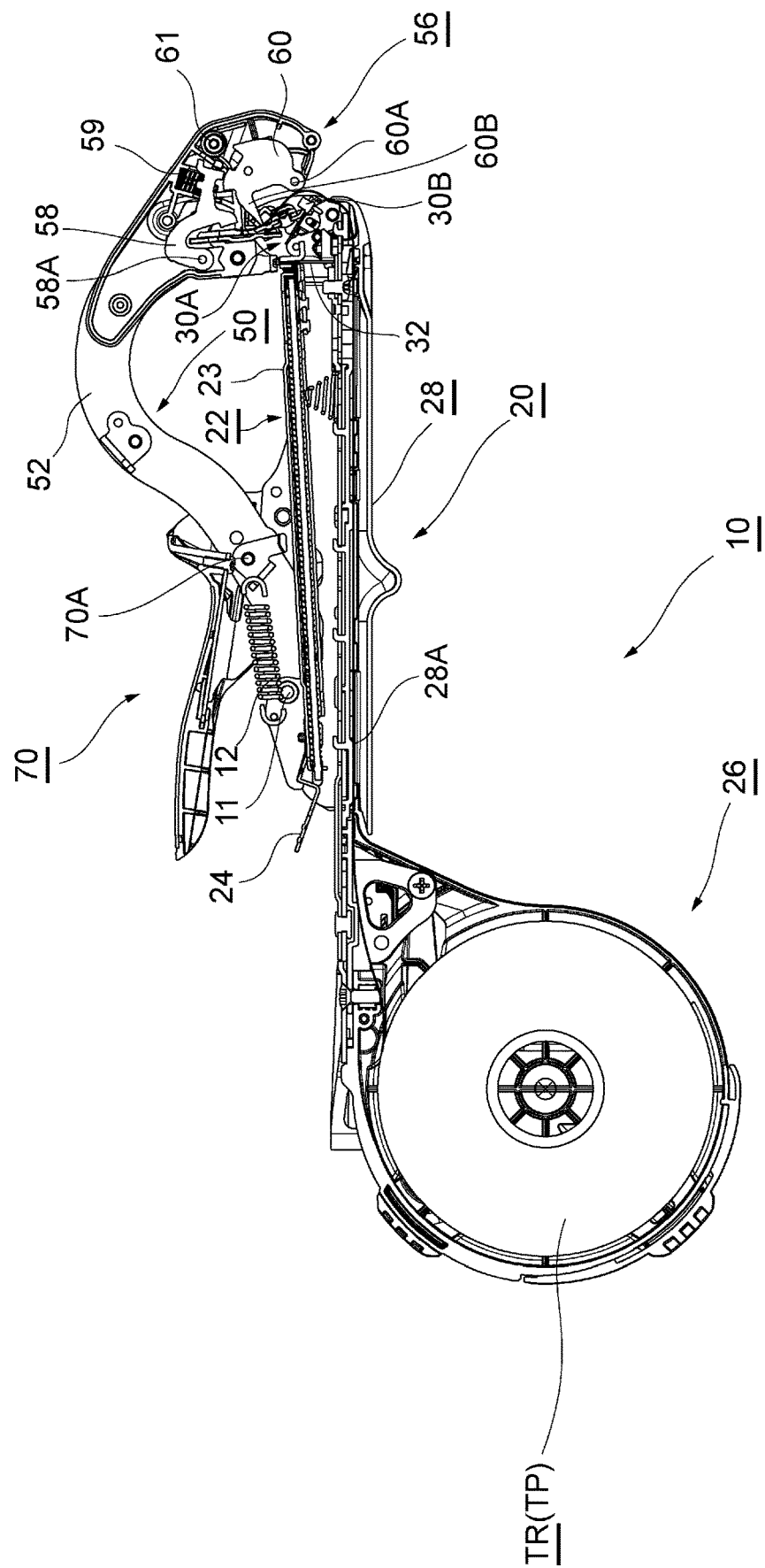
FIG. 3 is a cross-sectional view of the binding machine in a state where a tape is gripped.

Next, the operation of the binding machine 10 will be described with reference to FIGS. 4 to 8. The clincher arm 50 is constantly biased by the tension spring 12, and in a standby state illustrated in FIGS. 1 and 2, the clincher arm 50 is in an open state with respect to the main handle 20. When the user grips the operation handle 70 and the main handle 20 from this state, the clincher arm 50 is rotated in the closing direction with respect to the main handle 20 as illustrated in FIG. 3.

Then, when the clincher arm 50 performs first rotation to approach a predetermined position with respect to the main handle 20, in order to pull out the tape TP (with reference to FIG. 4), the gripping operation of gripping the tape TP by the tape gripping unit 56 of the clincher arm 50 is executed. The tape gripping unit 56 is an example of a tape gripping mechanism for gripping a tape.

Figure 4:
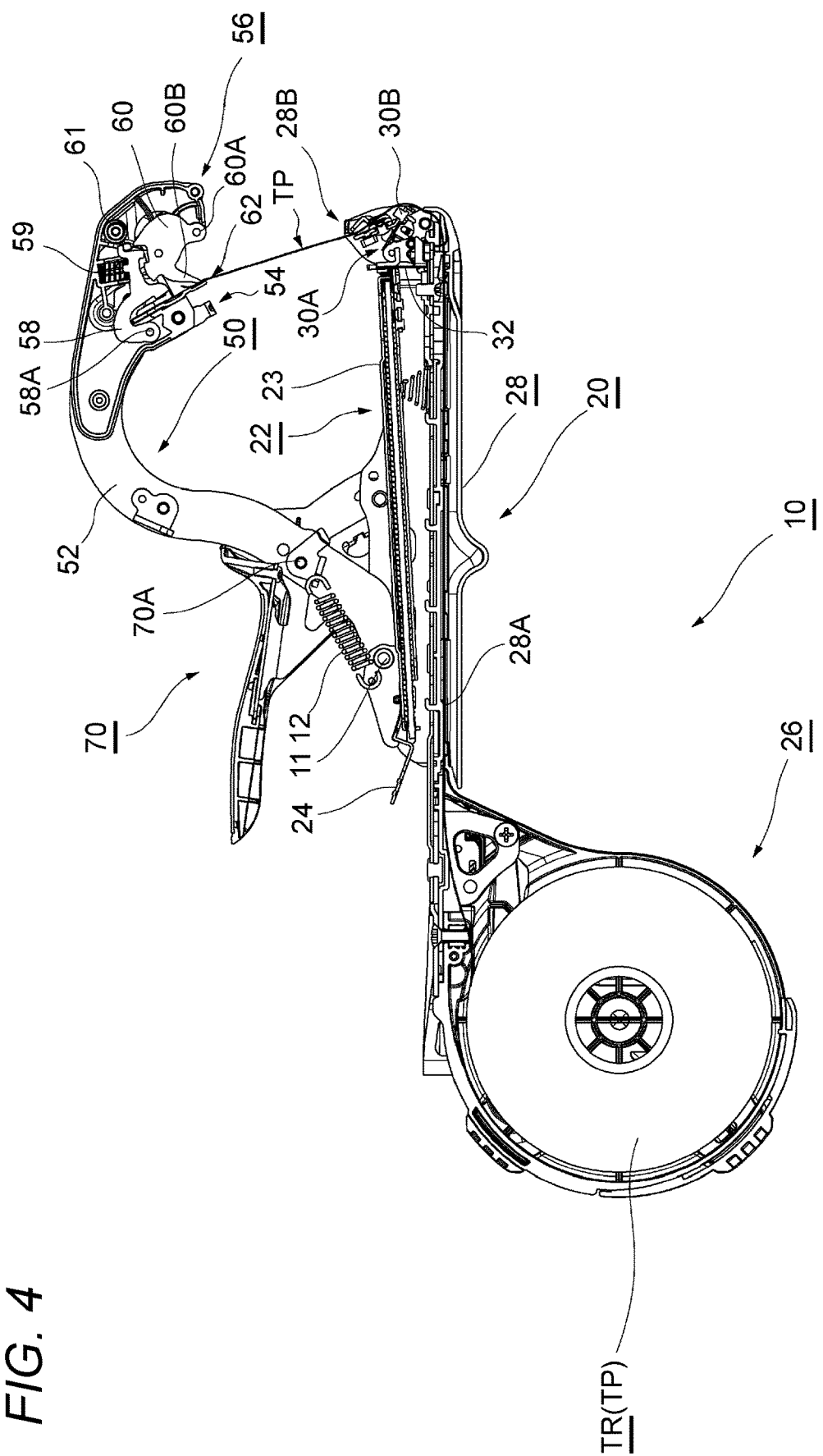
FIG. 4 is a cross-sectional view of the binding machine in a state where the tape is pulled out.

Thereafter, when the gripping of the main handle 20 is weakened and the clincher arm 50 is rotated in the opening direction with respect to the main handle 20, as shown in FIG. 4, the tape gripping unit 56 of the clincher arm 50 and the tape guide 28B of the main handle 20 are separated from each other in a state where the tape TP is held, and the tape TP is stretched between the clincher arm 50 and the main handle 20.

Figure 5:
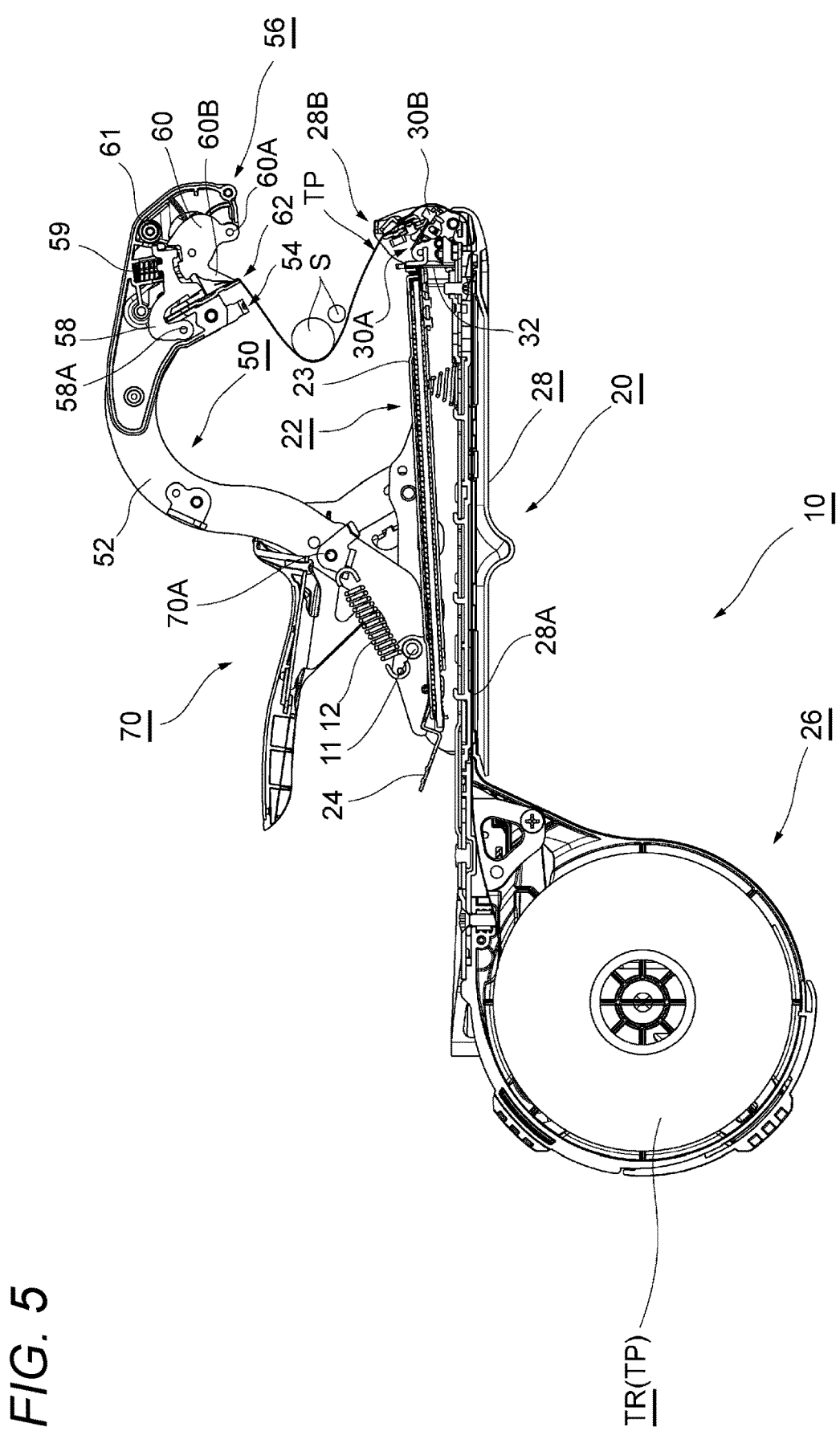
FIG. 5 is a cross-sectional view of the binding machine in a state where a binding object is inserted.
Figure 6:
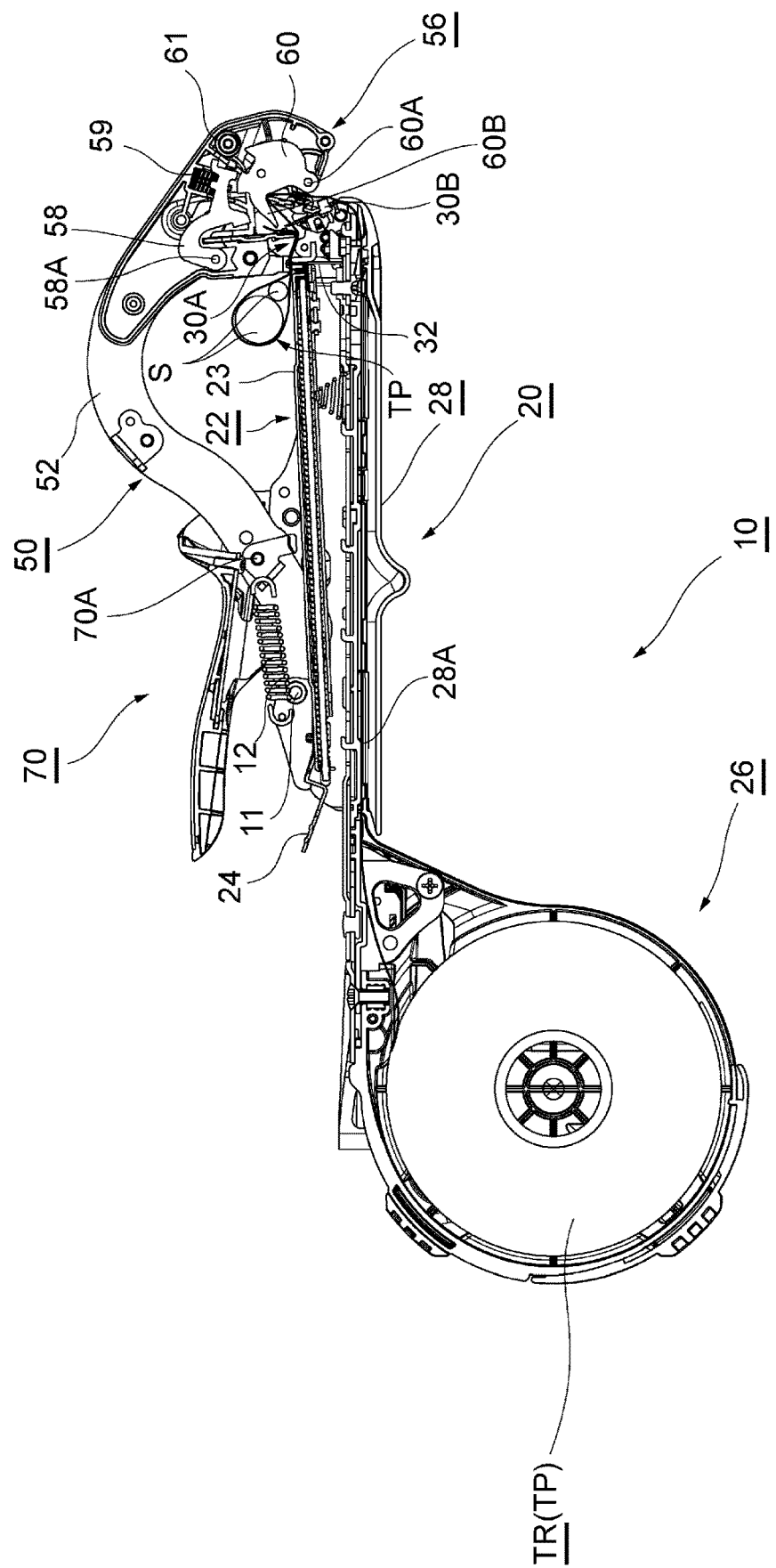
FIG. 6 is a cross-sectional view of the binding machine in a state where striking of a staple is started.

As shown in FIG. 5, when the binding object S such as a seedling or a branch is put in from the outside of the tape TP stretched in this state and the clincher arm 50 performs second rotation for closing again, as shown in FIG. 6, a tape loop of the tape TP that binds the binding object S is formed. The staple magazine unit 22 is pressed by the clincher arm 50, so that the staple magazine unit 22 rotates in the closing direction. At this time, the staple driver 32 pushes out the staple ST from the staple accommodating portion 23, and a pair of leg portions 101, 102 (with reference to FIG. 9) of the pushed out staple ST is folded by the clincher 54, and thus the staple ST is struck into the tape TP.

Figure 7:
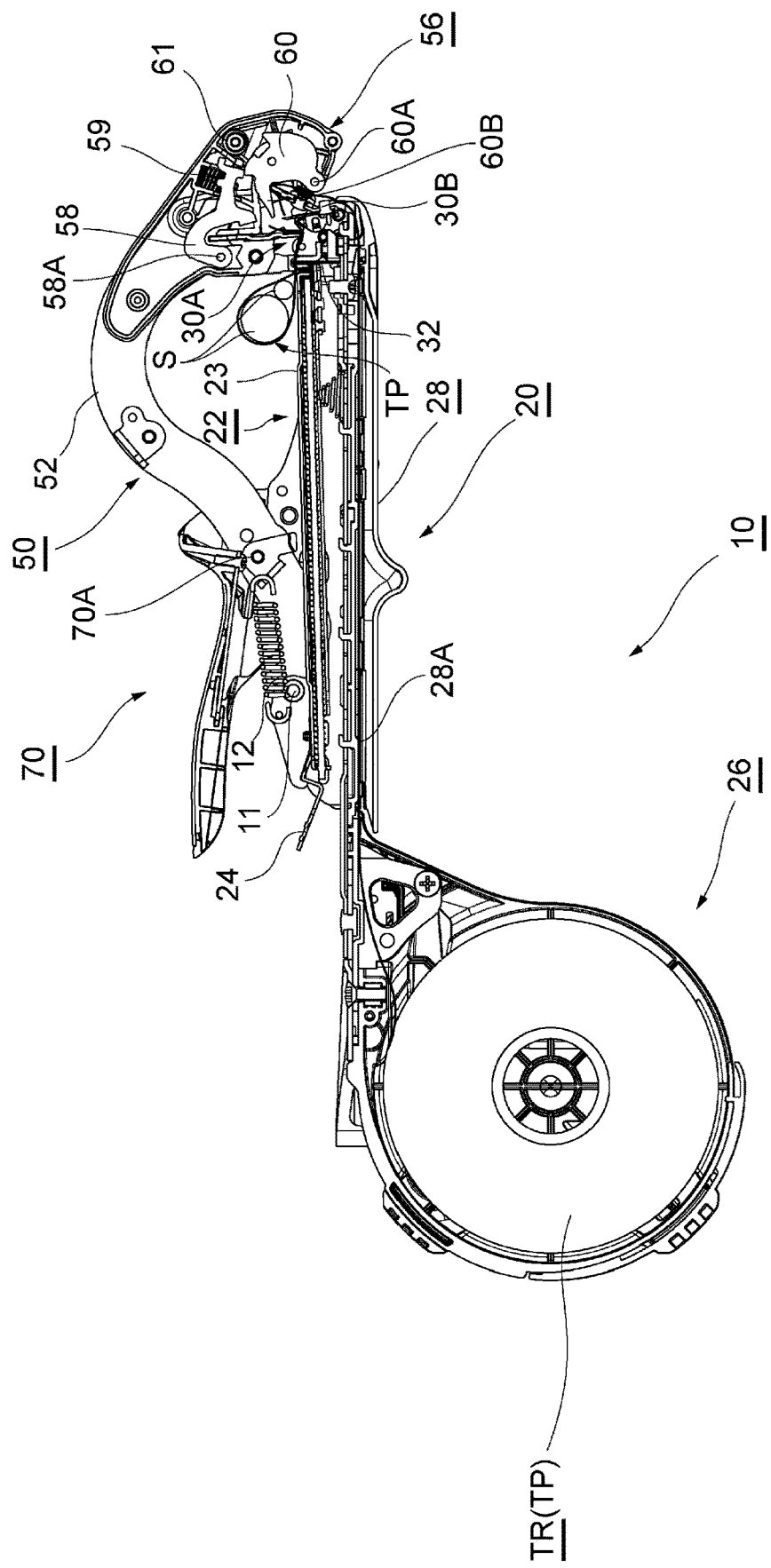
FIG. 7 is a cross-sectional view of the binding machine in a state where the staple is being struck.
Figure 8:
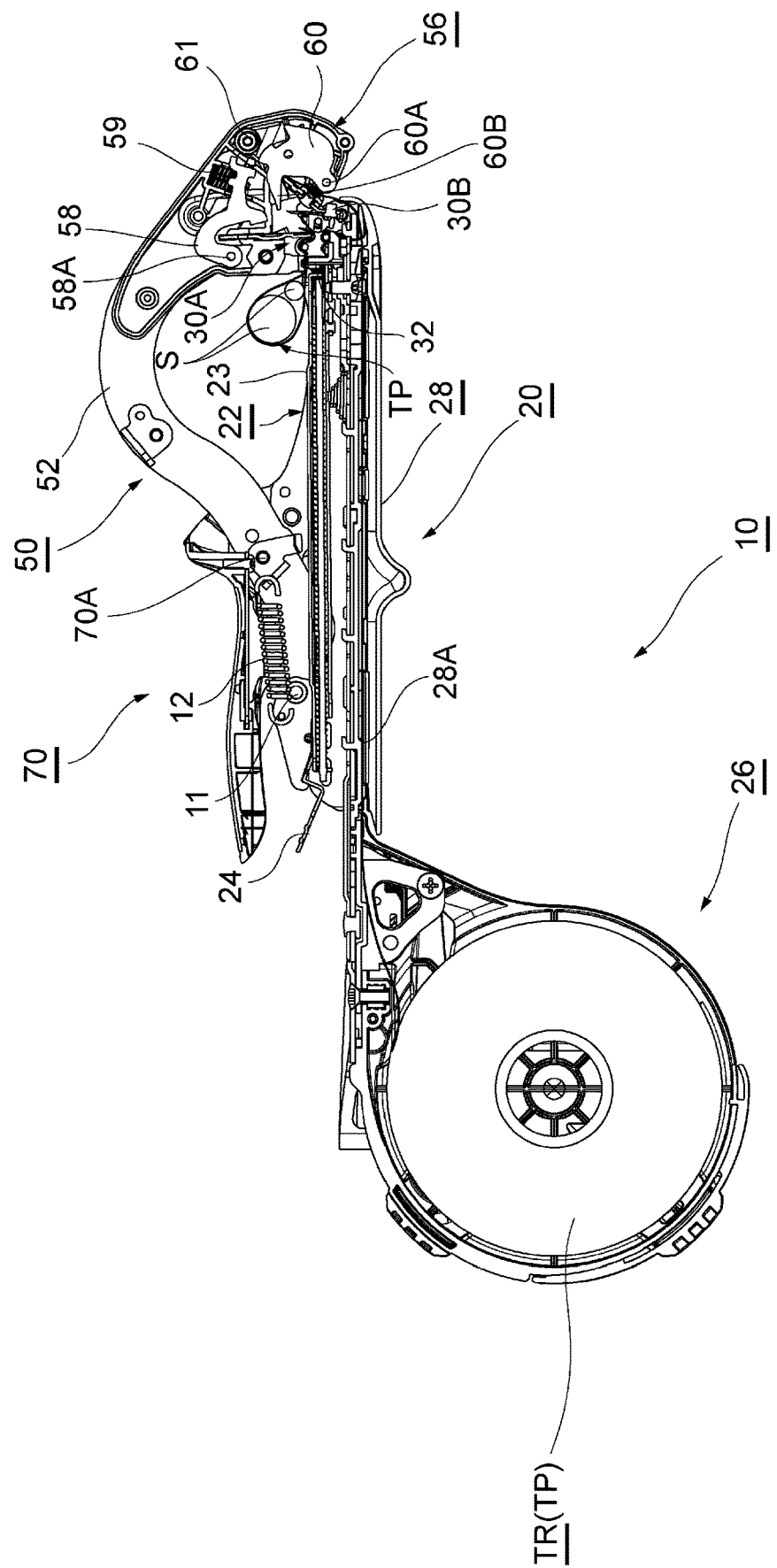
FIG. 8 is a cross-sectional view of the binding machine in a state where striking of the staple is completed.

Therefore, as shown in FIGS. 7 and 8, both end portions of the tape loop that binds the binding object S are bound by the staple ST. The tape TP is cut by the cutting blade 30A, and the binding operation is executed. In this way, the gripping operation is performed in a first gripping operation (first rotation), and the binding operation is performed in a second gripping operation (second rotation). Then, the binding objects S can be bonded by alternately performing the gripping operation and the binding operation.

Hereinafter, the characteristic structure of the binding machine 10 will be described in detail.

[Staple Magazine Unit]

Figure 9:
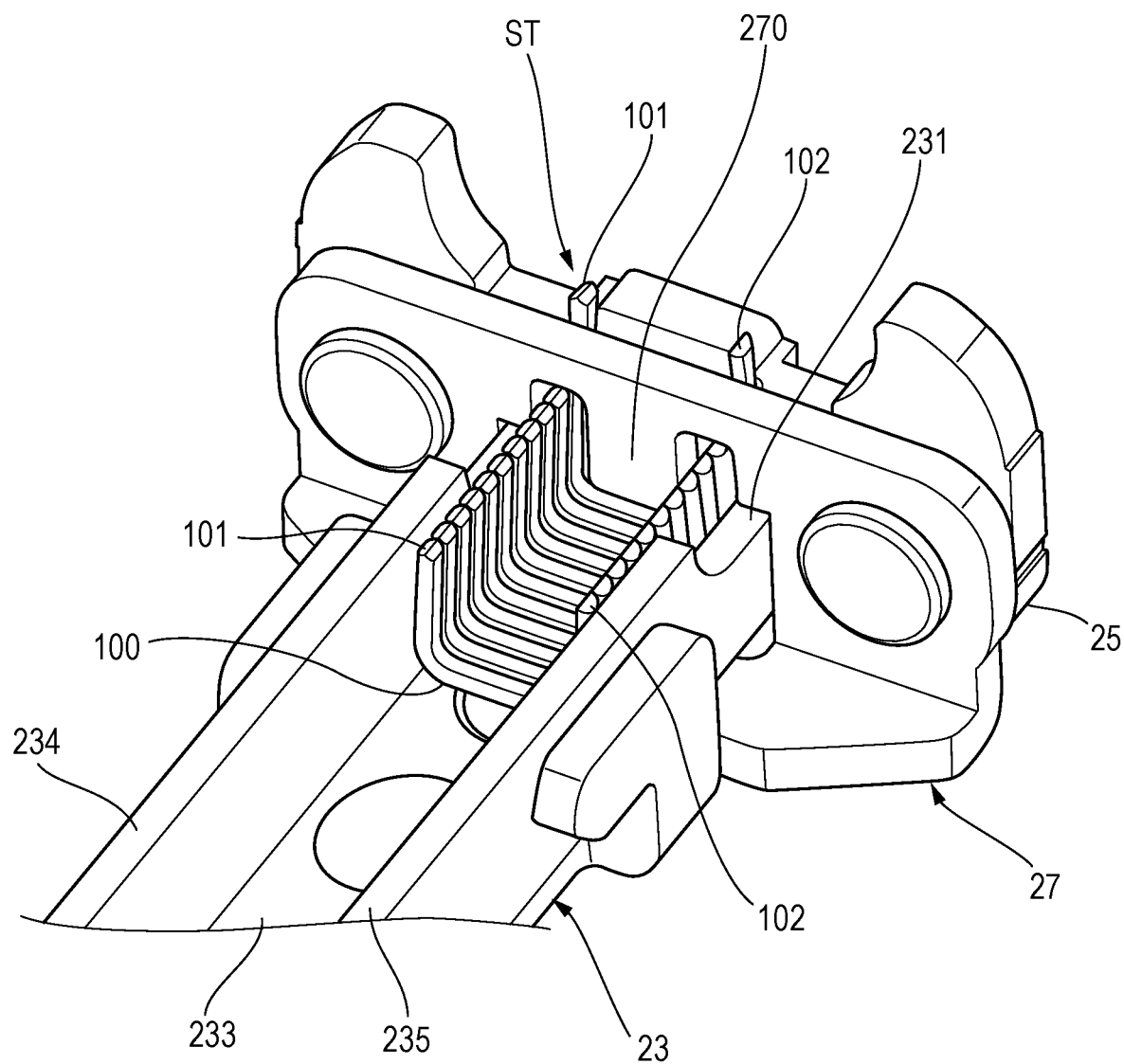
FIG. 9 is a perspective view showing a staple guide portion according to a first embodiment of the present invention.

FIG. 9 is a perspective view showing a staple guide portion 27 according to a first embodiment of the present invention. The staple guide portion 27 faces a rear side of the crown portion 100 of the staple ST in a state where the staple ST is being struck (with reference to FIG. 7).

In the illustrated example, the staple guide portion 27 is mounted to the staple accommodating portion 23 for accommodating the staple ST. The staple guide portion 27 may be configured as an integral structure with the staple accommodating portion 23, or the staple guide portion 27 may be configured as an integral structure with a clincher guide 25. The staple guide portion 27 has an extending portion 270 extending to an inside of the staple accommodating portion 23.

As shown in FIG. 9, a plurality of staples ST are accommodated in the staple accommodating portion 23 with the crown portions 100 facing downward. Each staple ST is formed in a U-shape including the crown portion 100 and the pair of leg portions 101, 102.

Figure 10:
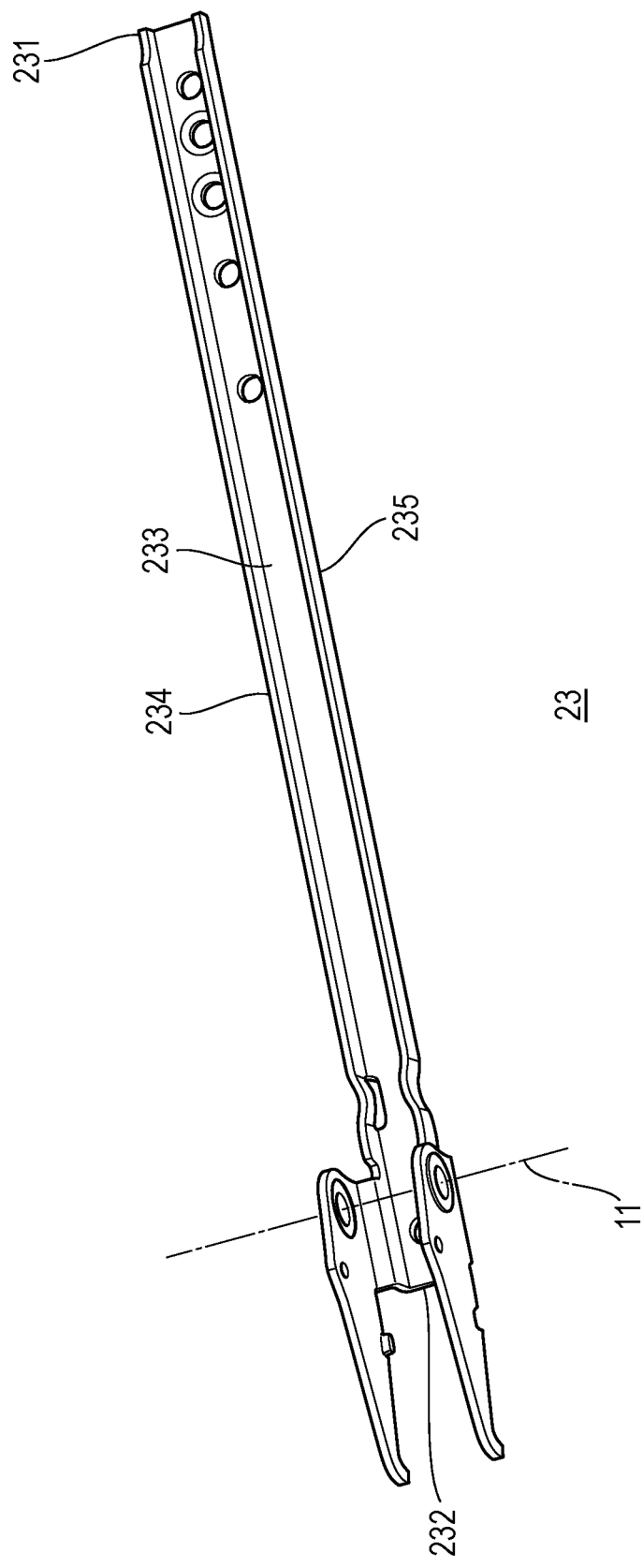
FIG. 10 is a perspective view showing a staple accommodating portion shown in FIG. 9.

FIG. 10 is a perspective view showing the staple accommodating portion 23 shown in FIG. 9. As shown in FIG. 10, the staple accommodating portion 23 is a long sheet metal member having a U-shaped cross section, and includes a base end portion 232 supported by the rotation shaft 11 of the binding machine 10 and a front end portion 231 on an opposite side of the base end portion 232. The staple accommodating portion 23 is configured to accommodate the staples ST at least at the front end portion 231.

The staple accommodating portion 23 has a bottom wall portion 233 extending along the crown portions 100 of the staples ST accommodated in the staple accommodating portion 23 and a pair of side wall portions 234, 235 extending along the pairs of leg portions 101, 102 of the staples ST respectively.

Figure 11:
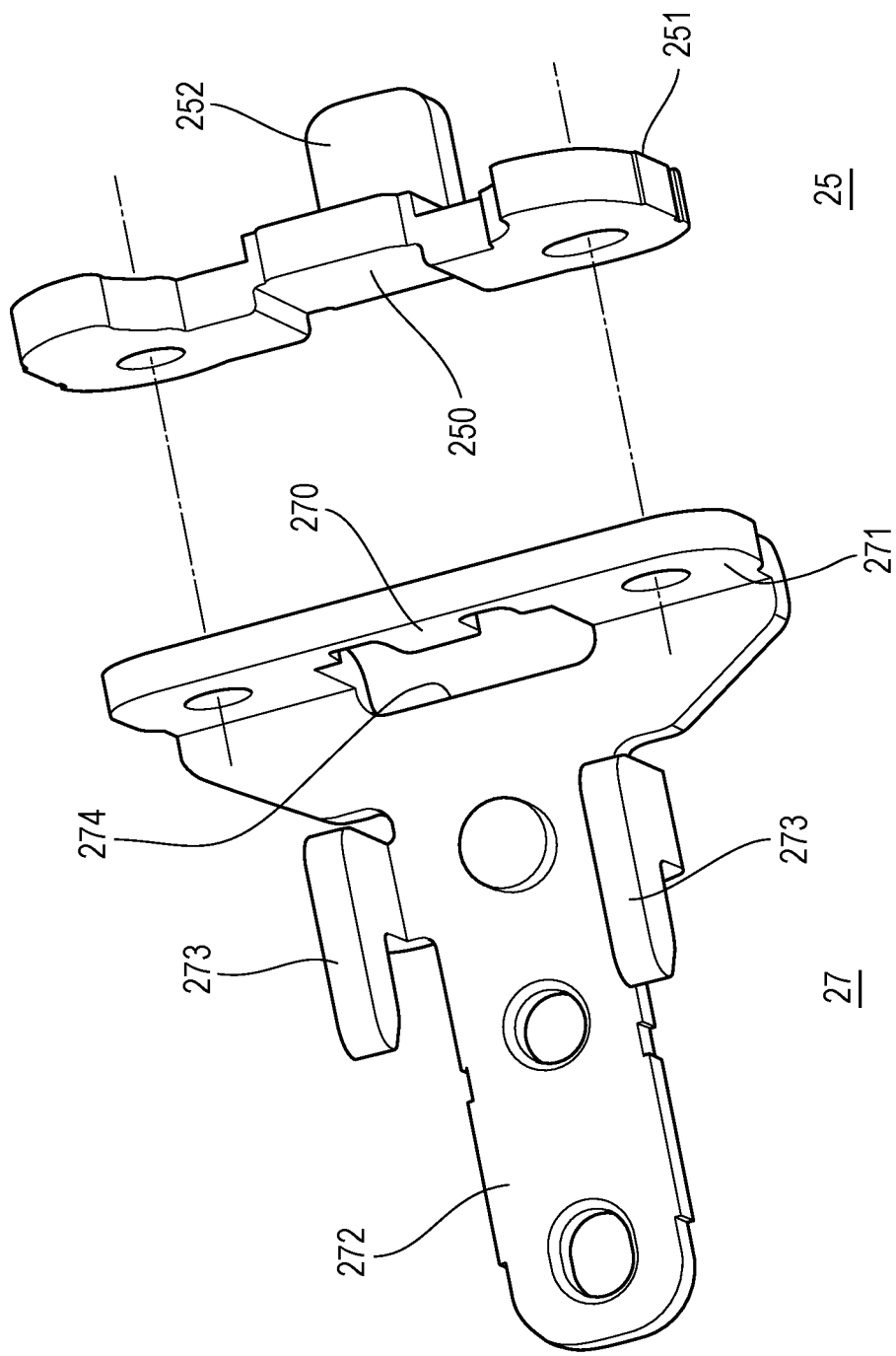
FIG. 11 is a perspective view showing the staple guide portion shown in FIG. 9.

FIG. 11 is a perspective view showing the staple guide portion 27 shown in FIG. 9. As shown in FIG. 11, in addition to the extending portion 270, the staple guide portion 27 has a first attachment portion 271 to which the clincher guide 25 is attached; a second attachment portion 272 to which the bottom wall portion 233 of the staple accommodating portion 23 is attached; positioning portions 273 which extend from the second attachment portion 272 and laterally face the pair of side wall portions 234, 235 of the staple accommodating portion 23; and a through hole 274 which is provided between the first attachment portion 271 and the second attachment portion 272 and into which the front end portion 231 of the staple accommodating portion 23 is inserted.

In the illustrated example, the clincher guide 25 forms the front wall surface of the staple accommodating portion 23 against which a side surface of the staple ST at the front end is pressed. The clincher guide 25 includes a front wall portion 250 that forms the front wall surface described above, an attachment portion 251 attached to the first attachment portion 271 of the staple guide portion 27, and a tongue piece portion 252 extending from the front wall portion 250 toward the front end portion 201 of the main handle 20.

Figure 12:
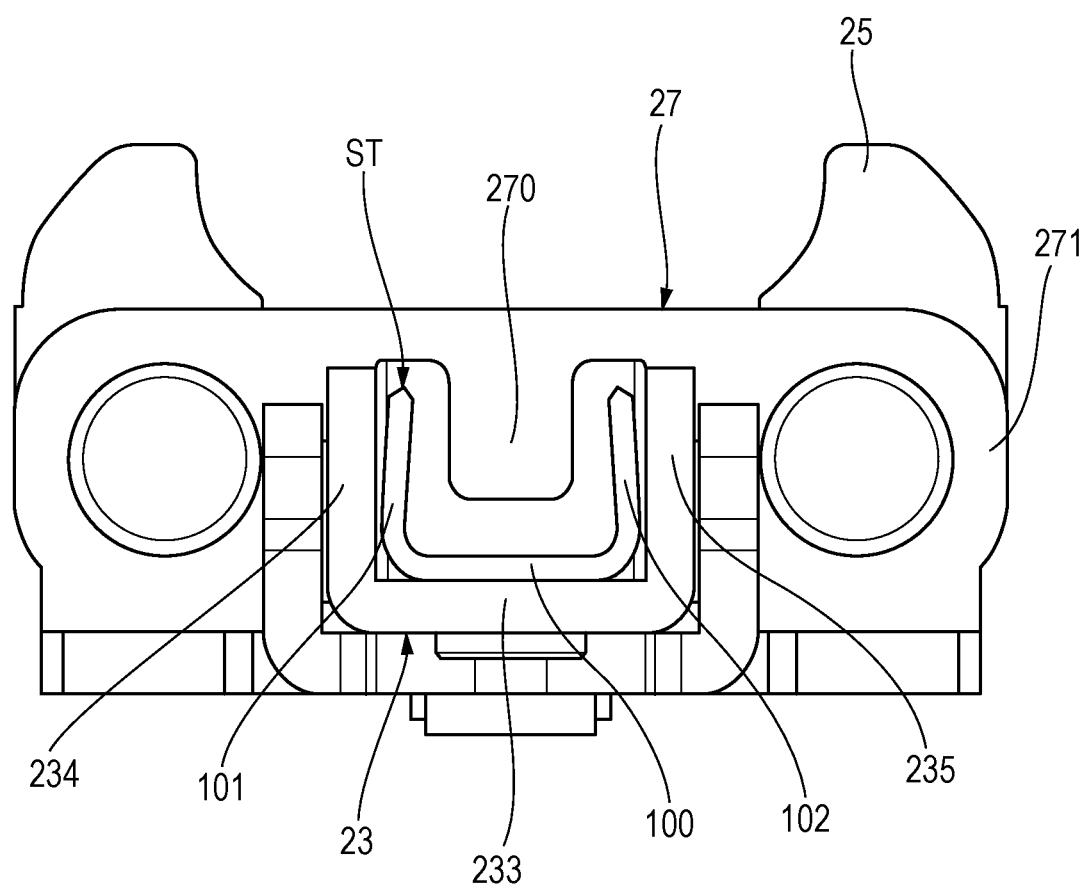
FIG. 12 is a rear view of the staple guide portion as seen from a base end portion side of the staple accommodating portion.

FIG. 12 is a rear view of the staple guide portion 27 as seen from a base end portion 232 of the staple accommodating portion 23. As shown in FIG. 12, the first attachment portion 271 of the staple guide portion 27 is provided to cross over the pair of side wall portions 234, 235, and the extending portion 270 is located between the pair of leg portions 101, 102 of the staple ST accommodated in the staple accommodating portion 23.

Figure 13:
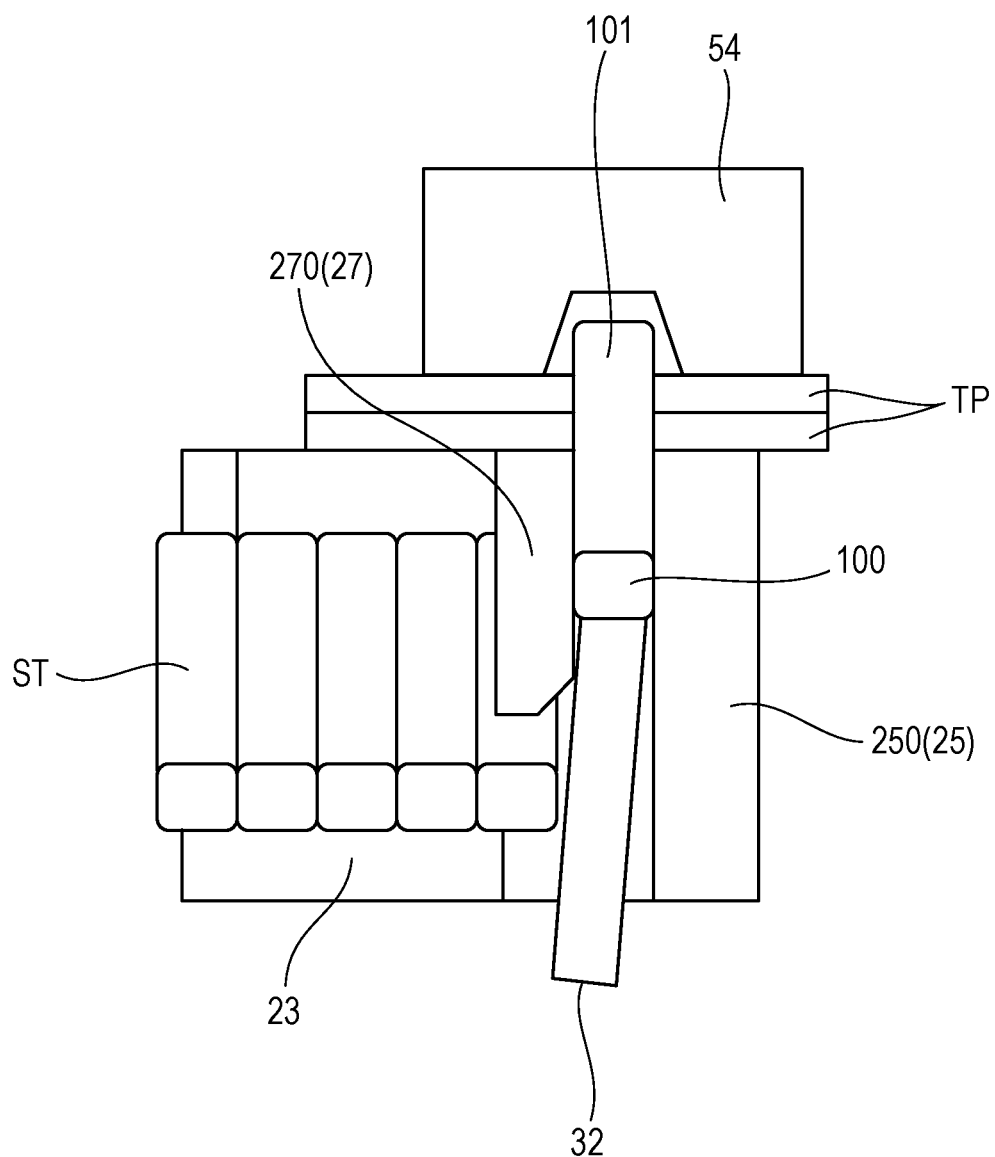
FIG. 13 is a cross-sectional view schematically showing a positional relationship between the staple and the staple guide portion in the state where the staple is being struck as shown in FIG. 7.
Figure 27:
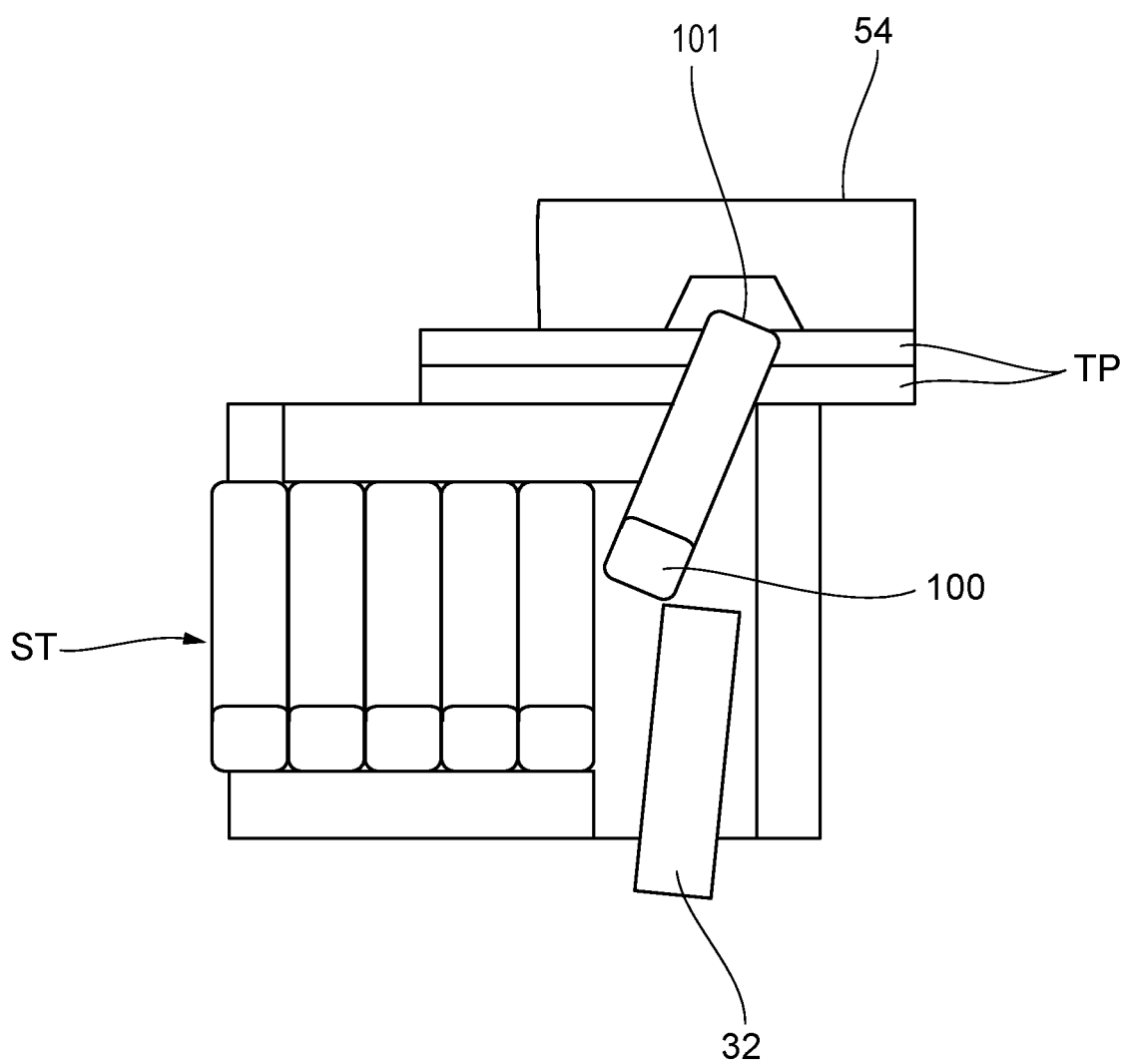
FIG. 27 is a cross-sectional view schematically showing a staple accommodating portion in a related-art binding machine shown for comparison with the present invention.

FIG. 13 is a cross-sectional view schematically showing a positional relationship between the staple ST and the staple guide portion 27 in the state where the staple ST is being struck as shown in FIG. 7. FIG. 27 is a cross-sectional view schematically showing a staple accommodating portion in a related-art binding machine shown for comparison with that shown in FIG. 13.

If the staple guide portion 27 is not provided, as shown in FIG. 27, when the tape TP is cut with a strong tension, tip ends of the leg portions 101, 102 of the staple ST are pulled by the tape TP to move forward, the crown portion 100 on an opposite side of the staple ST from the tip ends of the leg portions 101, 102 moves rearward, and the staple ST rotates.

When the binding machine 10 is gripped in a state where the staple ST falls over obliquely with respect to the front wall portion 250, the staple ST is deformed into an undesired shape between the clincher 54 and the staple driver 32, and the staple is caught.

The binding machine 10 of each embodiment of the present invention includes a staple guide portion 27 for preventing the staple ST from falling over. As shown in FIG. 13, the staple guide portion 27 faces the crown portion 100 of the staple ST from behind. Even if the tip ends of the leg portions 101, 102 are pulled by the tape TP, the staple guide portion 27 is abutted with the crown portion 100 and restricts a rearward movement of the crown portion 100, so that the staple ST does not rotate. The staple ST can be prevented from falling over.

However, in the binding machine 10 of the first embodiment shown in FIG. 13, the extending portion 270 of the staple guide portion 27 is fixed in position with respect to the front wall portion 250 of the clincher guide 25. If the staple ST is jammed in a gap between the extending portion 270 and the front wall portion 250, it is not easy to widen the gap.

Figure 14:
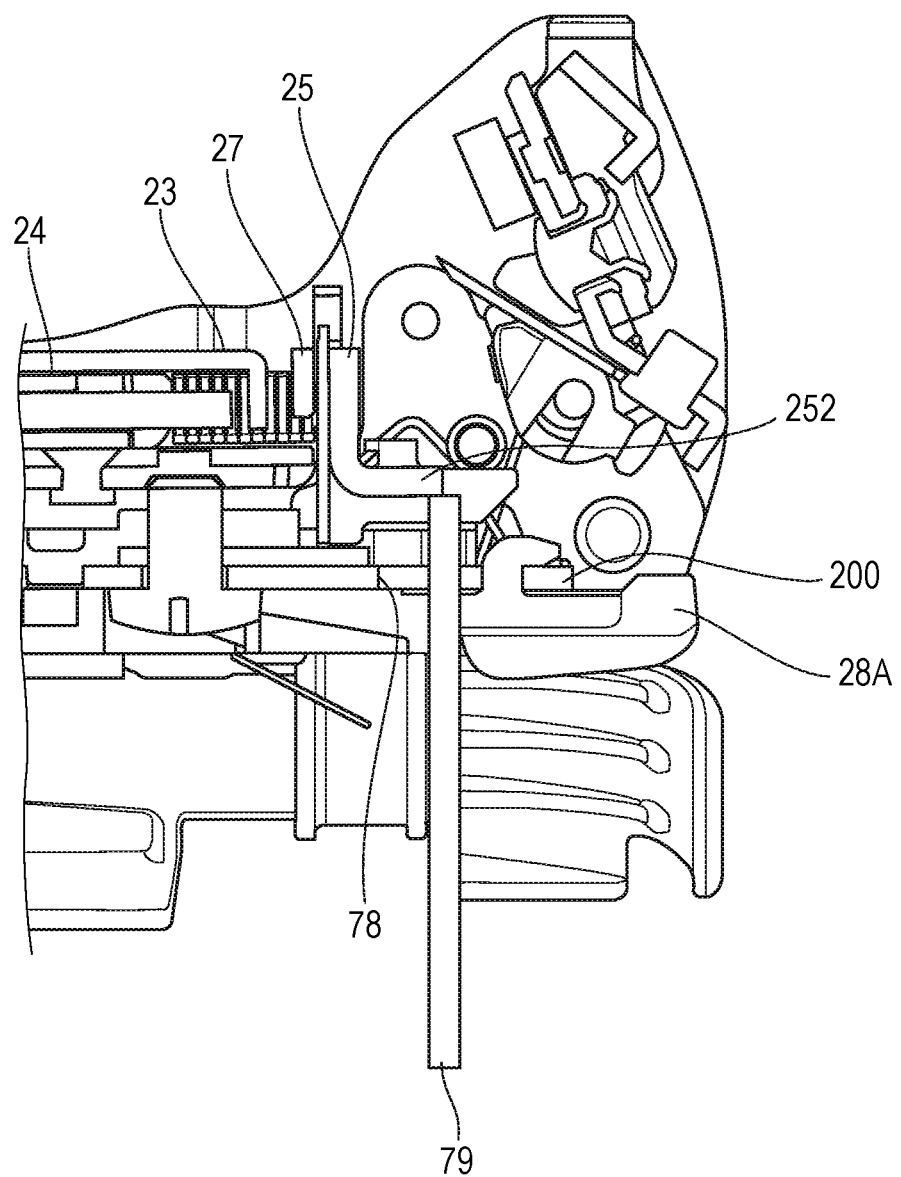
FIG. 14 is a cross-sectional view showing a state where a staple removing tool is pressed against a clincher guide through a through hole.

FIGS. 14 to 22 show an example of a removing unit that can remove a jammed staple ST without widening the gap between the extending portion 270 and the front wall portion 250. FIG. 14 is a cross-sectional view showing a state where a staple removing tool 79 is pressed against the clincher guide 25 through a through hole 78. In the illustrated example, the through hole 78 is formed immediately below the tongue piece portion 252 of the clincher guide 25 and in the bottom wall 200 of the main handle 20 and a bottom portion of the tape holder 28A of the tape transport unit 28.

Figure 15:
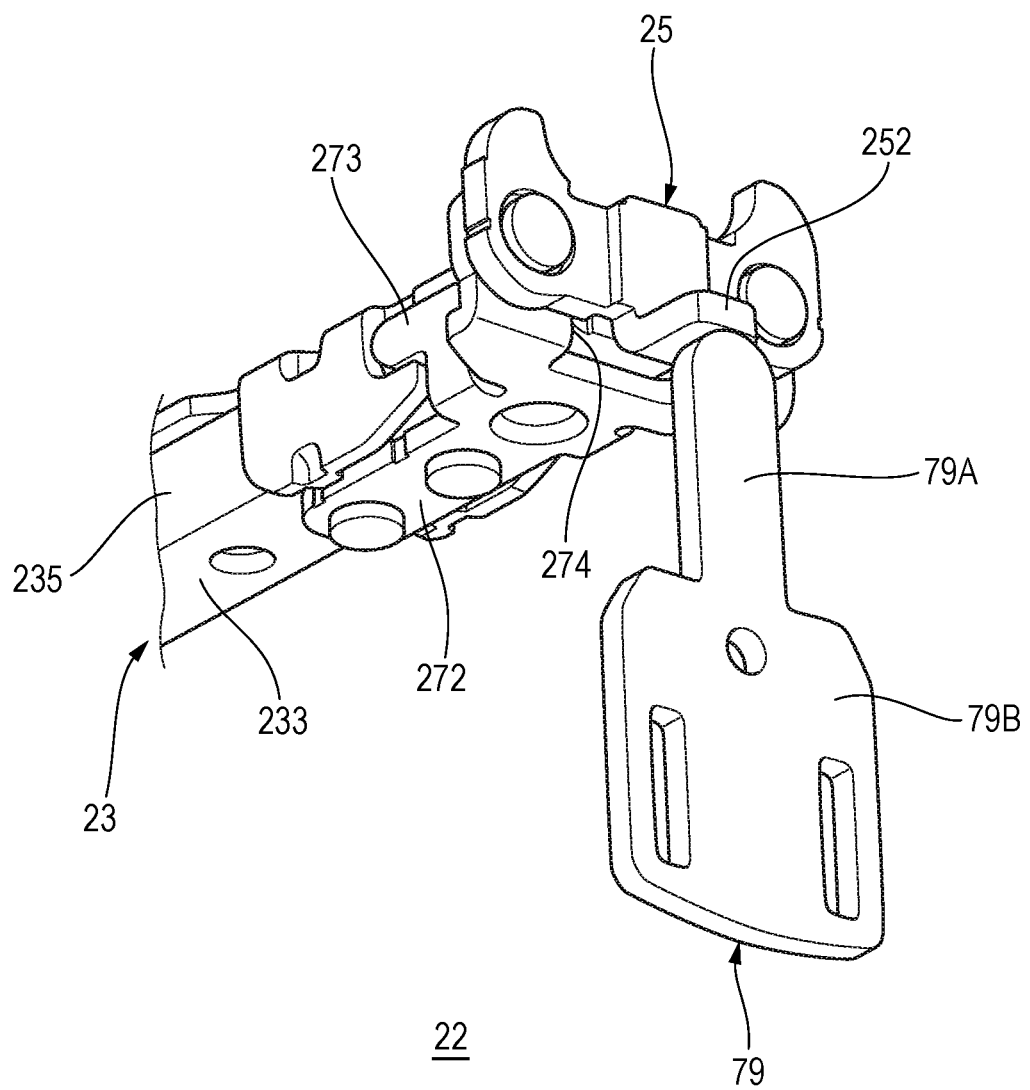
FIG. 15 is a perspective view showing an example of the staple removing tool shown in FIG. 14 as seen from a front end portion side of a main handle.

FIG. 15 is a perspective view of an example of the staple removing tool 79 shown in FIG. 14 as seen from the front end portion 201 of the main handle 20. The staple removing tool 79 has a protruding portion 79A, for example, having a length that can be inserted into the through hole 78 to press the tongue piece portion 252 of the clincher guide 25, and a gripping portion 79B that can be easily gripped by a user of the binding machine 10.

Figure 16:
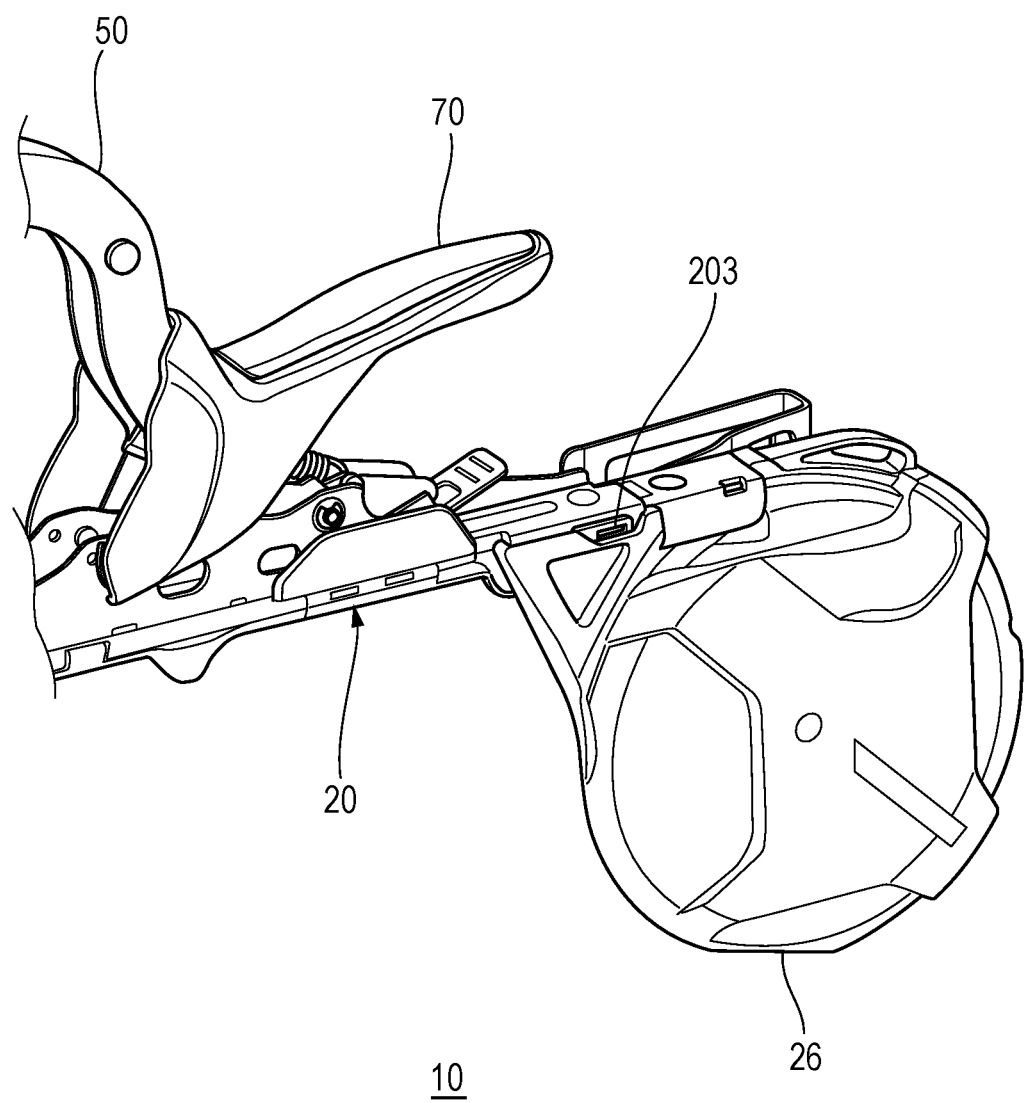
FIG. 16 is a perspective view showing the staple removing tool in a state of being accommodated in the main handle.

FIG. 16 is a perspective view showing the staple removing tool 79 in a state of being accommodated in the main handle 20. When the staple removing tool 79 has a flat plate shape, as shown in FIG. 16, the staple removing tool 79 can be accommodated and carried in a pocket 203 provided in the main handle 20.

Figure 17:
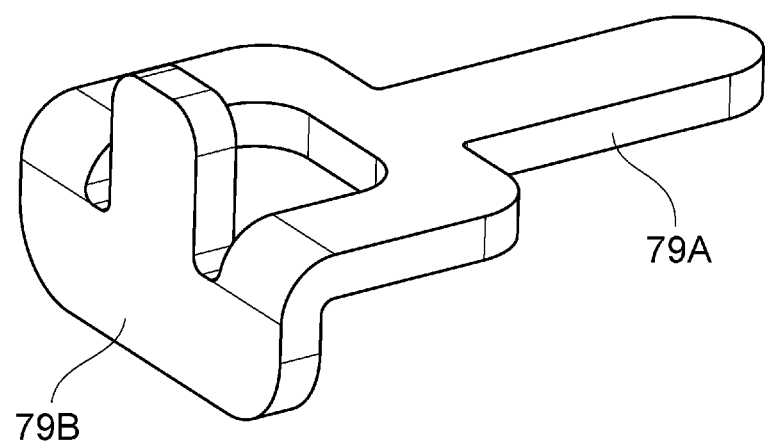
FIG. 17 is a perspective view showing a first modification of the staple removing tool.

FIG. 17 is a perspective view showing a first modification of the staple removing tool 79 shown in FIG. 15. In the illustrated example, the gripping portion 79B of the staple removing tool 79 is bent so as to be substantially orthogonal to the protruding portion 79A. When the tongue piece portion 252 of the clincher guide 25 is pressed by a front end of the protruding portion 79A, a bent surface rather than an end surface of the gripping portion 79B can be pressed with fingers, so that a user of the binding machine 10 can easily apply a force to the staple removing tool 19.

Figure 18:
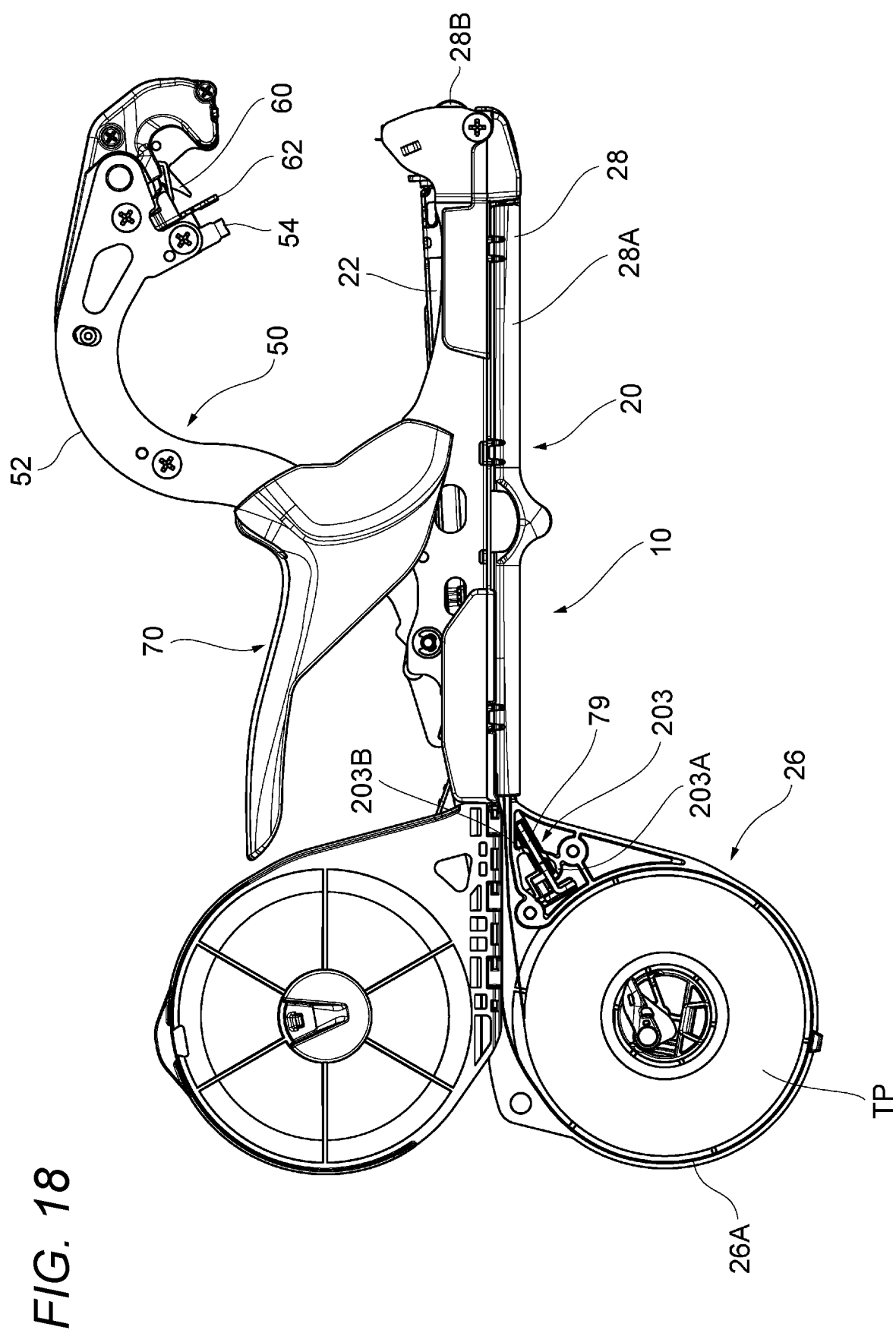
FIG. 18 is a right side view showing the staple removing tool in a state of being accommodated in a tape magazine unit.
Figure 19:
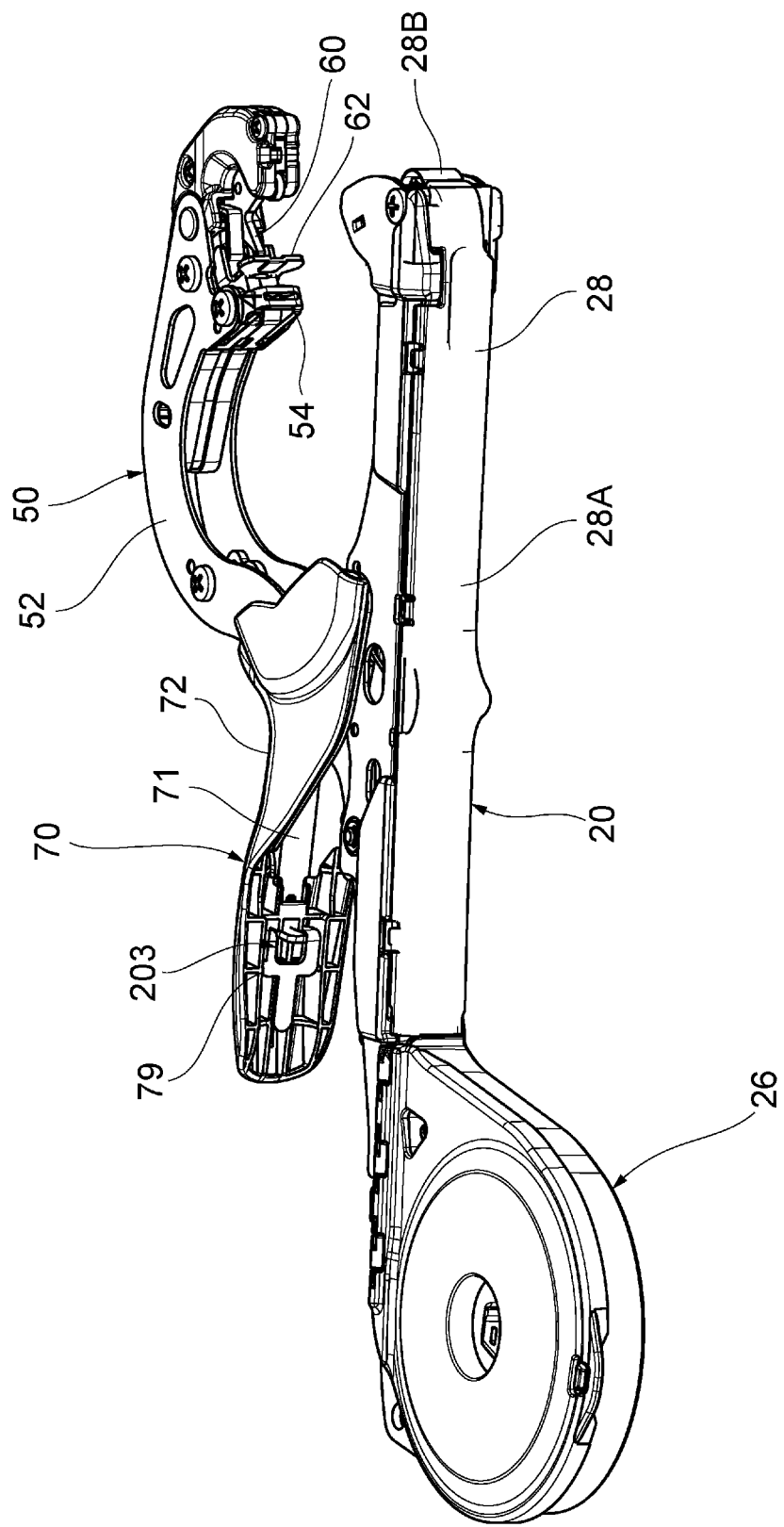
FIG. 19 is a perspective view showing the staple removing tool in a state of being accommodated in an operation handle.
Figure 20:
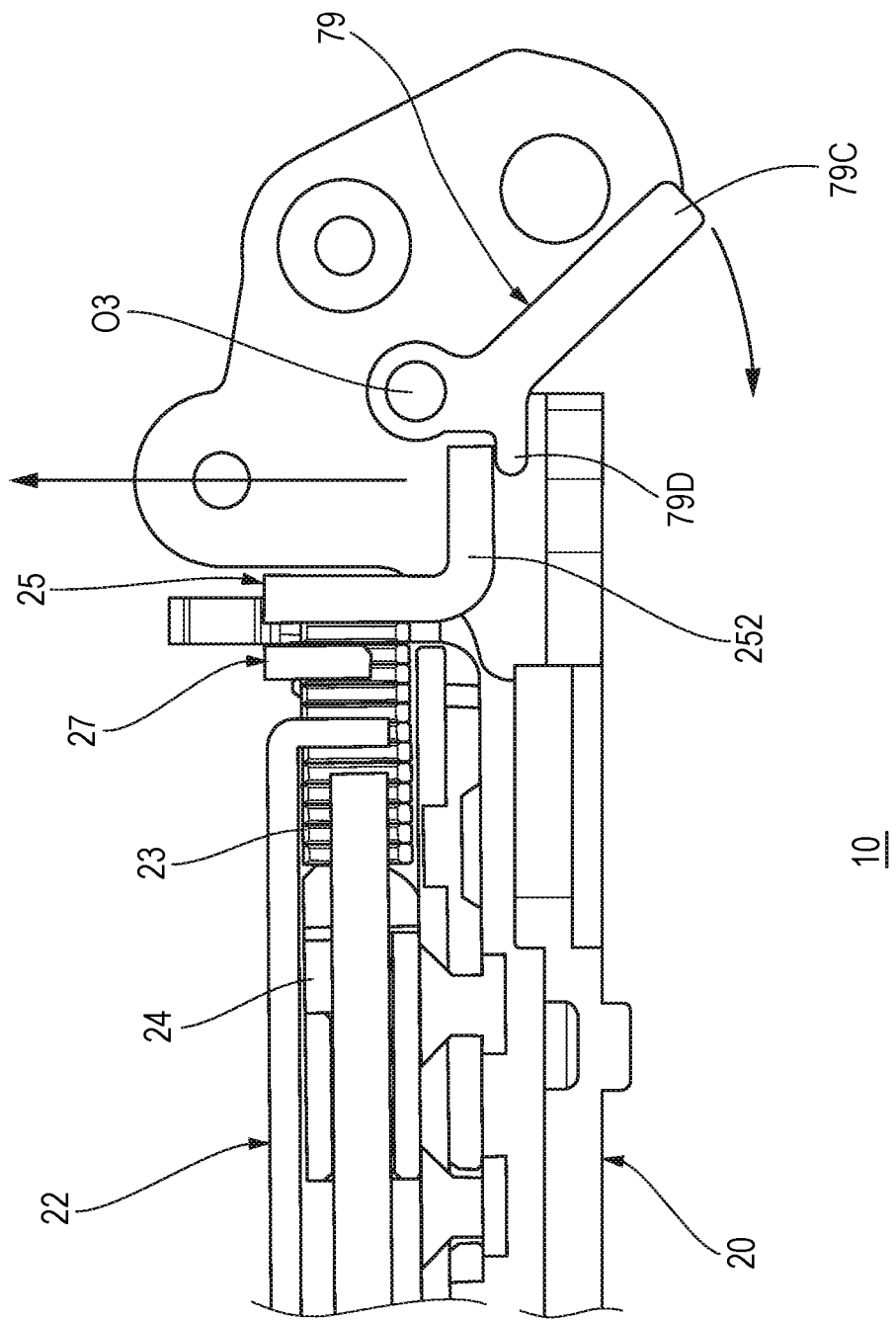
FIG. 20 is a cross-sectional view showing a second modification of the staple removing tool.

FIG. 18 is a right side view showing the staple removing tool 79 in a state of being accommodated in the tape magazine unit 26. In the illustrated example, the bent staple removing tool 79 is accommodated in the pocket 203 defined inside the tape magazine unit 26. Specifically, as an example, the pocket 203 is integrally provided with the tape magazine unit 26 in a region surrounded by a tape reel accommodating portion 26A serving as a portion for accommodating the tape TP that is provided in the tape magazine unit 26 and is wound in a reel shape and the tape holder 28A serving as a path for transporting the tape TP pulled out from the tape reel accommodating portion 26A. The pocket 203 includes at least one of rib portions 203A, 203B protruding inside the pocket 203. The staple removing tool 79 is held inside the pocket 203 by being sandwiched by the rib portions 203A, 203B. In this example, since the pocket 203 is provided in the region surrounded by the tape reel accommodating portion 26A and the tape holder 28A, the staple removing tool 79 can be accommodated without enlarging an outer shape of the binding machine 10. FIG. 19 is a perspective view showing the staple removing tool 79 in a state of being accommodated in the operation handle 70. The operation handle 70 includes a metal frame 71 rotatably connected to the main handle 20, and a resin cover 72 covering the metal frame 71. An outer side of the resin cover 72 has a rounded shape so that a user of the binding machine 10 can easily hold the operation handle 70. In the illustrated example, the pocket 203 is provided on an inner side of the resin cover 72, and the bent staple removing tool 79 is accommodated therein. FIG. 20 is a cross-sectional view showing a second modification of the staple removing tool 79. In the illustrated example, the staple removing tool 79 is always mounted to the main handle 20. When a lever 79C of the staple removing tool 79 is pushed down, the staple removing tool 79 rotates around a fulcrum O3, a projection portion 79D provided between the lever 79C and the fulcrum O3 pushes up the tongue piece portion 252 of the clincher guide 25.

Figure 21:
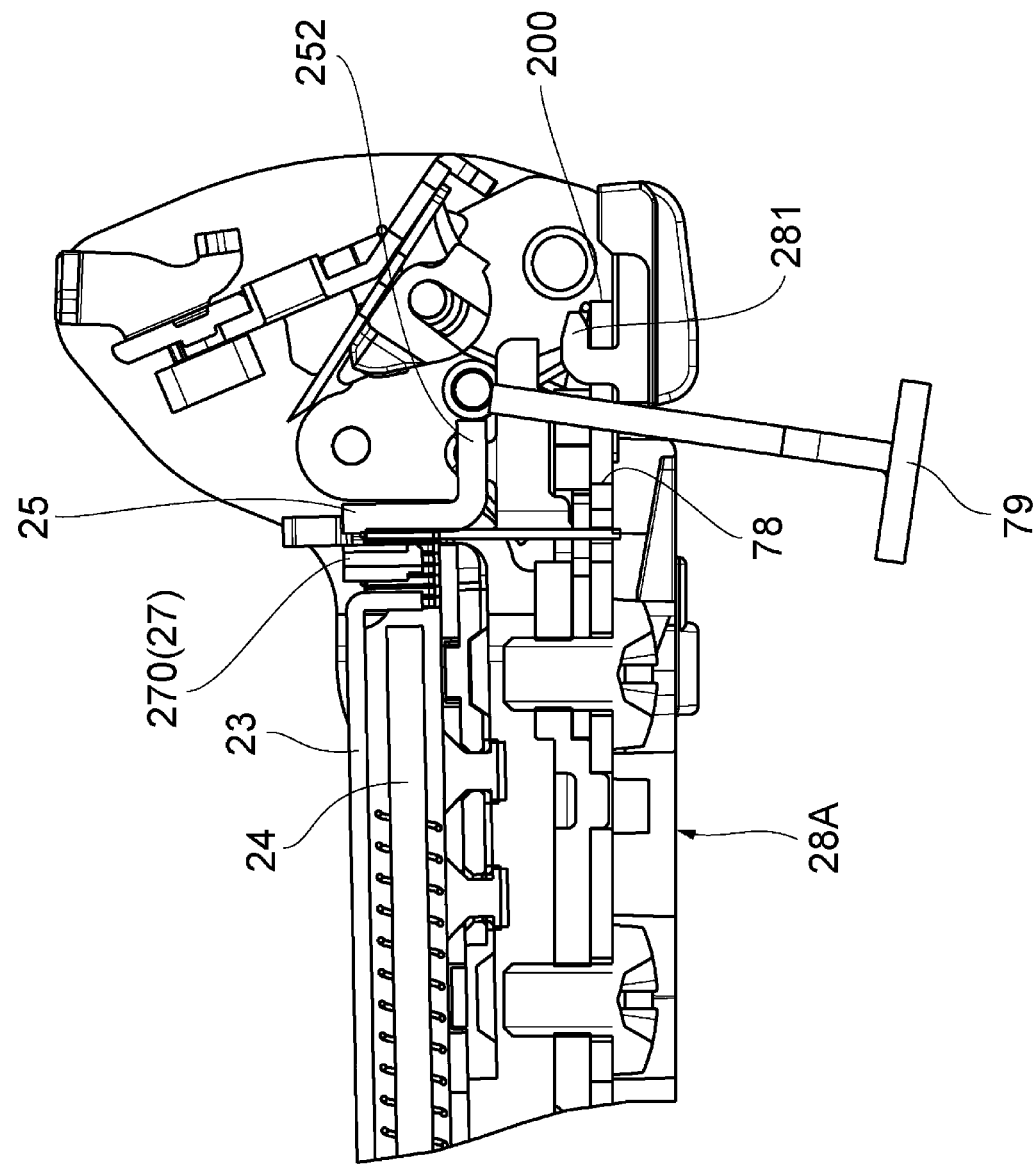
FIG. 21 is a cross-sectional view showing a state where the staple removing tool shown in FIG. 14 is inserted in a wrong direction.

FIG. 21 is a cross-sectional view showing a state where the staple removing tool 79 shown in FIG. 14 is inserted in a wrong direction. When a direction in which the staple removing tool 79 is inserted is inclined with respect to the main handle 20, the front end of the protruding portion 79A of the staple removing tool 79 may not be able to press the tongue piece portion 252 of the clincher guide 25 well. A guide member for guiding the protruding portion 79A of the staple removing tool 79 may be added in order to make sure that the front end of the protruding portion 79A reaches the tongue piece portion 252.

Figure 22:
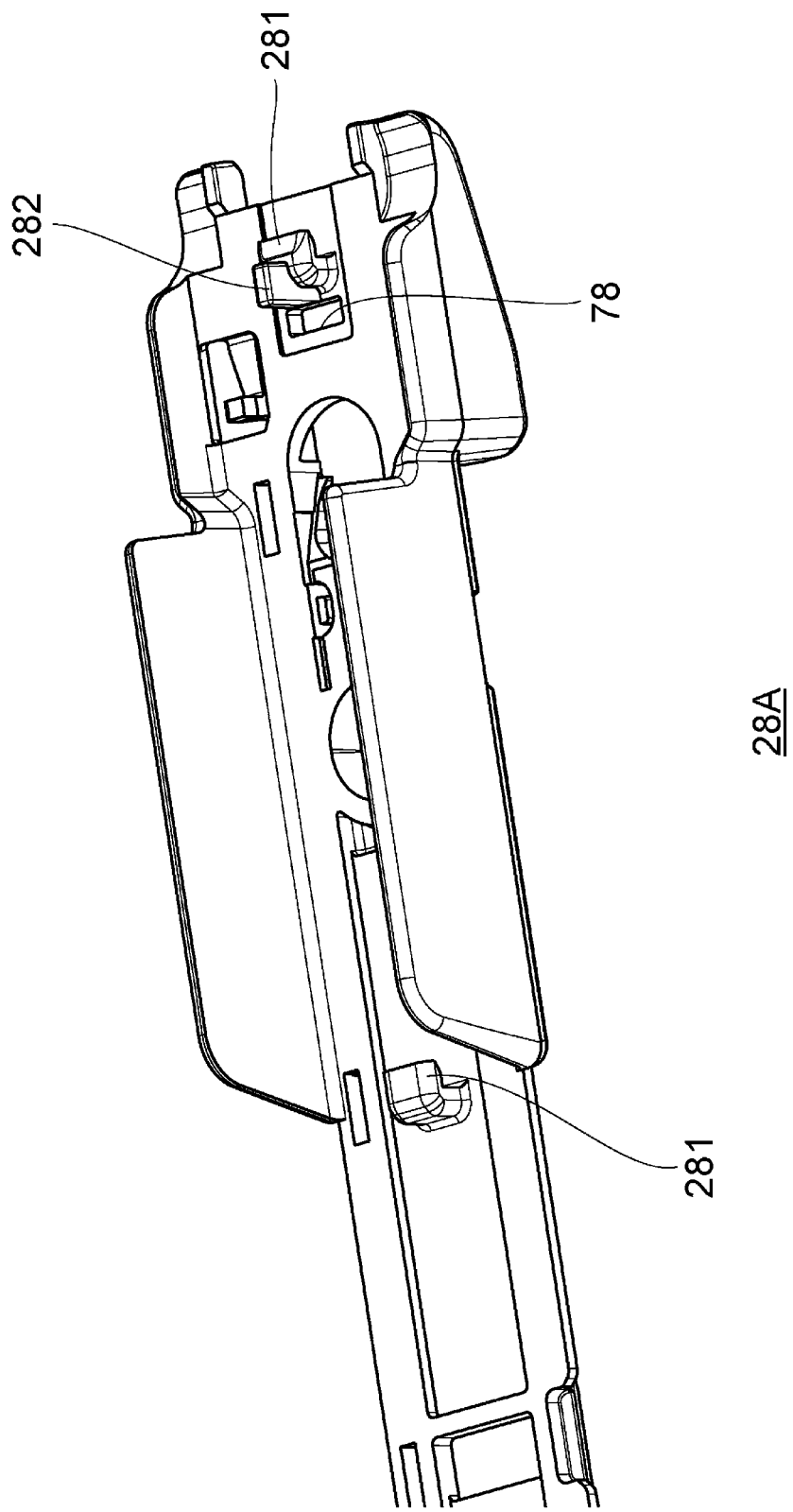
FIG. 22 is a perspective view showing a modification of a tape holder shown in FIG. 14.

FIG. 22 is a perspective view showing a modification of the tape holder 28A shown in FIG. 14. The tape holder 28A made of resin material is provided with hooks 281 for fixing the tape holder 28A to the bottom wall 200 (shown in FIG. 21) of the main handle 20, and a through hole 78 through which the staple removing tool 79 is inserted, and the like. In the illustrated example, a guide member 282 is provided to overlap the hook 281 adjacent to the through hole 78.

The guide member 282 is located on the front end side of the main handle 20 with respect to the through hole 78 and extends in a thickness direction of the bottom wall 200 of the main handle 20. When the staple removing tool 79 is inserted obliquely with respect to the main handle 20, the protruding portion 79A is abutted with the guide member 282 and a movement thereof in the thickness direction of the bottom wall 200 of the main handle 20 is restricted, so that the staple removing tool 79 can be guided such that the front end of the protruding portion 79A reliably reaches the tongue piece portion 252.

According to the binding machine 10 of the first embodiment of the present invention configured as described above, since the crown portion 100 of the staple ST is supported by the staple guide portion 27 so as not to move backward as described above, so that the staple ST can be prevented from falling over during striking of the staple ST. Even if the staple ST is jammed in the gap between the staple guide portion 27 and the clincher guide 25, the tongue piece portion 252 of the clincher guide 25 can be pressed to easily remove the staple ST.

Second Embodiment

Figure 23:
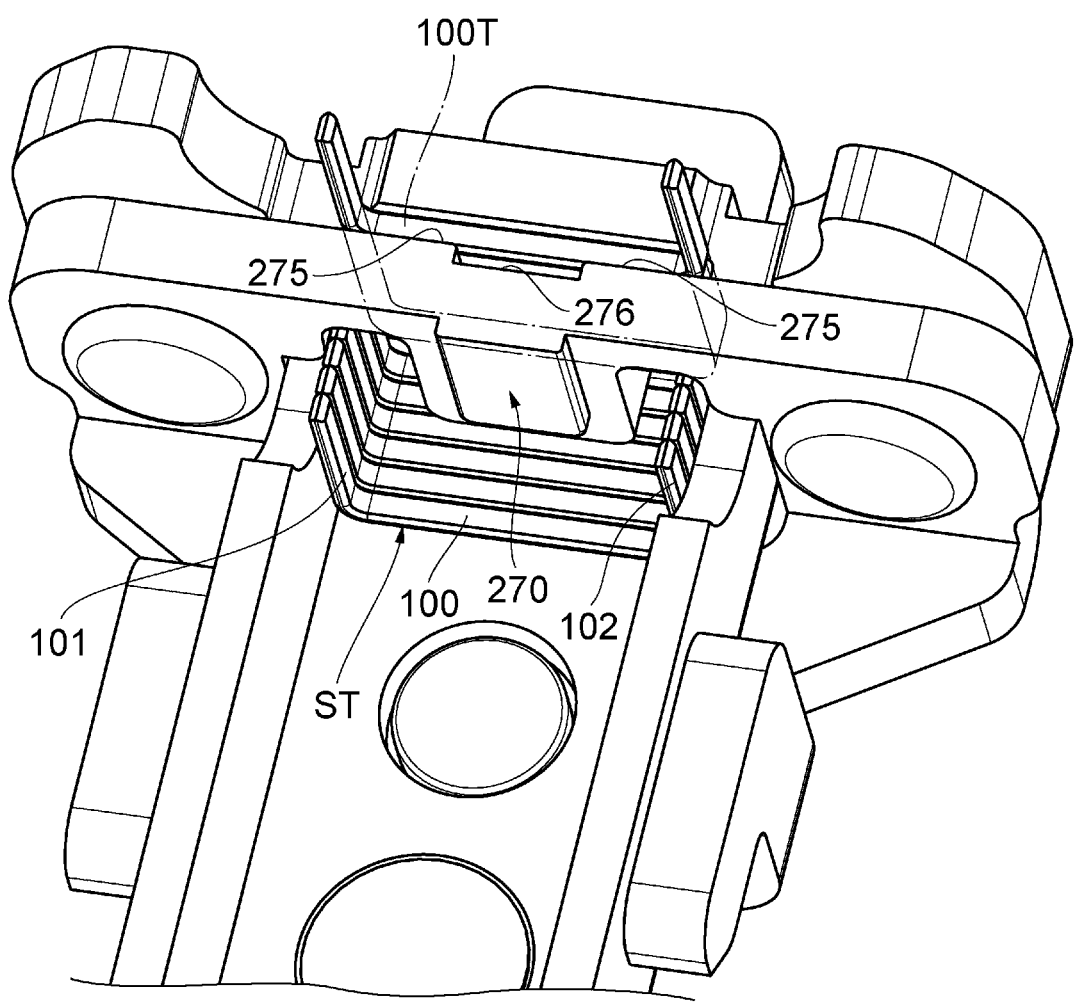
FIG. 23 is a perspective view showing a staple guide portion according to a second embodiment of the present invention.

For a second embodiment, description of matters common to the first embodiment will be omitted, and only different points will be described. FIG. 23 is a perspective view showing a staple guide portion 270 according to a second embodiment of the present invention. The second embodiment is different from the first embodiment in that an non-supporting portion 276 is provided with a predetermined distance from the staple.

As shown in FIG. 23, the extending portion 270 includes a supporting portion 275 that can support the staple ST by abutting with the staple ST such that the staple ST does not fall over, and the non-supporting portion 276 that is not abutted with the staple ST and does not support the staple ST. The supporting portion 275 is provided along a movement trajectory 100T of the crown portion 100 pushed by the staple driver 32 toward the clincher 54. The non-supporting portion 276 is provided as a recess formed in a surface of the extending portion 270 on a side toward the front end portion 231 and is provided with a distance from the movement trajectory 100T.

In the illustrated example, a step between the supporting portion 275 and the non-supporting portion 276 is formed to be smaller than a plate thickness of the staple guide portion 27. When a wire diameter of the crown portion 100 in an arrangement direction of the staples ST that are connected to each other by an adhesive is measured, the step between the supporting portion 275 and the non-supporting portion 276 is formed to be larger than half of the wire diameter of the crown portion 100. The step can be formed, for example, by press working such as half punching or cutting such as grooving. The non-supporting portion 276 is an example of the recess.

Figure 24:
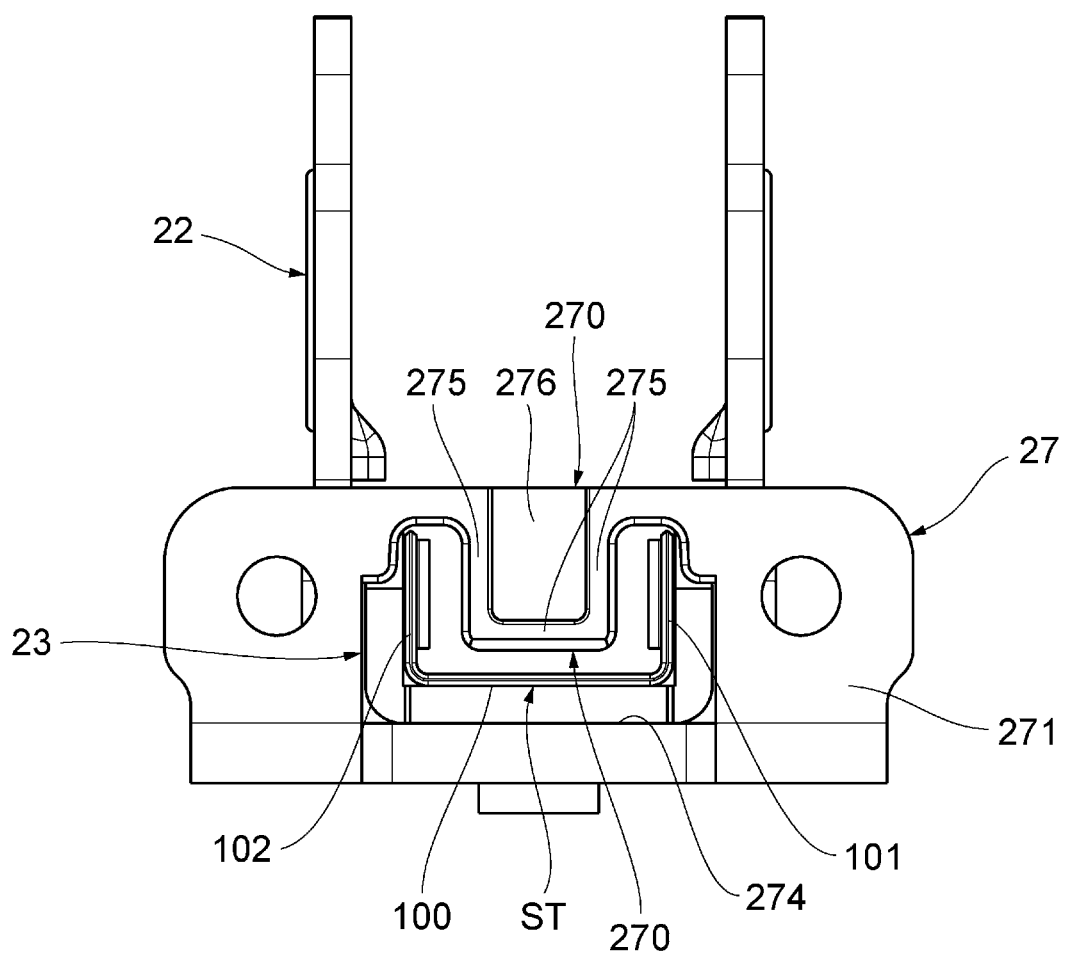
FIG. 24 is a front view showing the staple guide portion shown in FIG. 23 as seen from the front end portion side of the main handle.

FIG. 24 is a front view showing the staple guide portion 270 shown in FIG. 23 as seen from the front end portion 201 of the main handle 20. In the illustrated example, the supporting portion 275 is provided at left and right end portions of the extending portion 270 in a width direction Y of the main handle 20, respectively. The non-supporting portion 276 is provided in a left-right central portion sandwiched by the supporting portions 275, 275. That is, the non-supporting portion 276 is provided at a position adjacent to the supporting portions 275, 275, more specifically, between one supporting portion 275 and the other supporting portion 275. In the illustrated example, in addition to the left and right end portions of the extending portion 270, the supporting portion 275 is formed in a U shape extending to a lower end portion of the extending portion 270.

According to the second embodiment, when the staple jamming occurs, a contact area between the supporting portions 275 and the staple ST is small, so that the supporting portions 275 and the staple ST are not caught by a strong force. The staple ST is removed easily. Shapes of the supporting portion 275 and the non-supporting portion 276 are not limited to the illustrated example, and for example, in the extending portion 270, a plurality of supporting portions 275 and non-supporting portions 276 may be repeatedly provided in a vertical striped pattern. The lower end portion of the extending portion 270 may be the non-supporting portion 276.

As shown in FIG. 24, if the supporting portions 275 are provided at both left and right end portions of the extending portion 270, it is preferable that the supporting portions 275 support the left and right evenly and prevent the staple ST from falling over. If the non-supporting portion 276 is collectively provided in the center of the extending portion 270, when the staple jamming occurs, it is easy to remove the jammed staple ST by inserting a tool such as a flat-blade screwdriver into a space between the non-supporting portion 276 and the staple ST.

Third Embodiment

Figure 25:
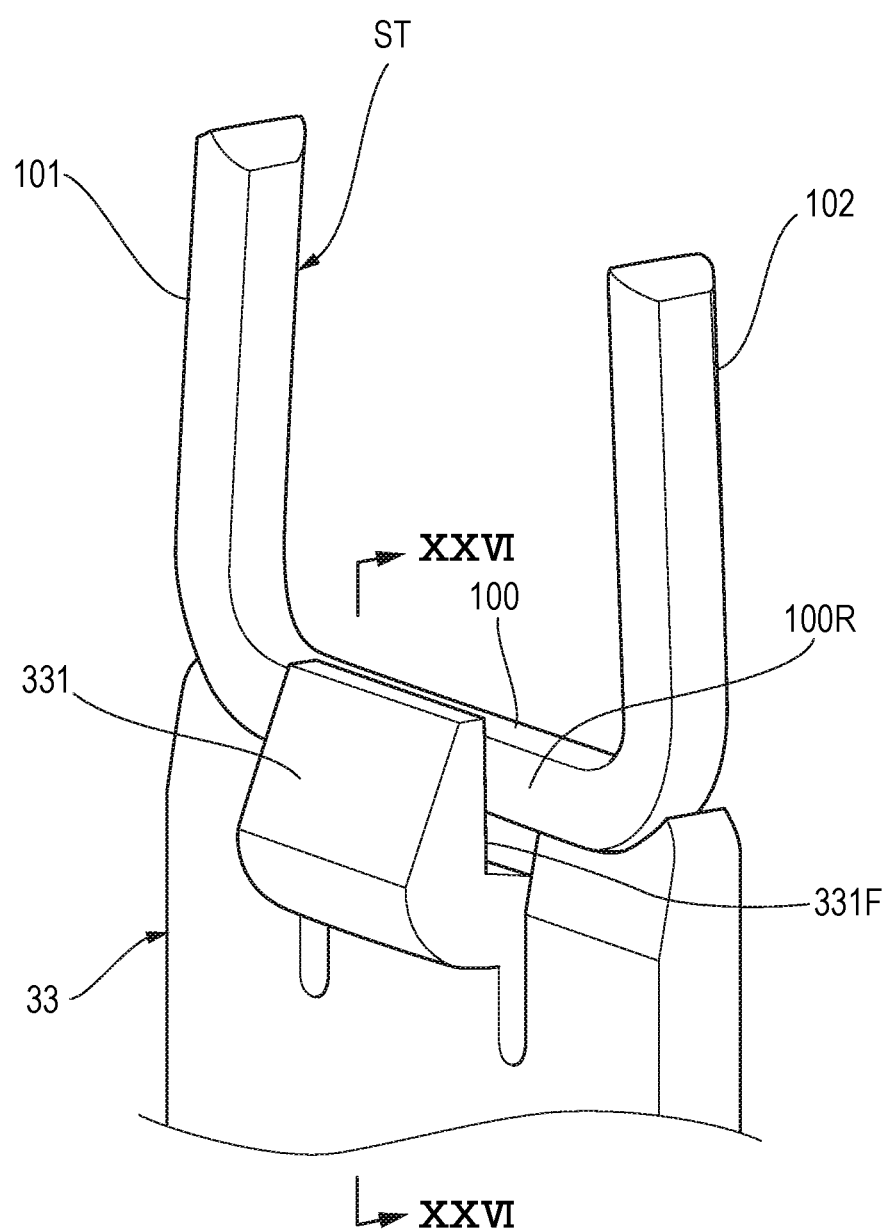
FIG. 25 is a perspective view showing a staple guide portion according to a third embodiment of the present invention.
Figure 26:
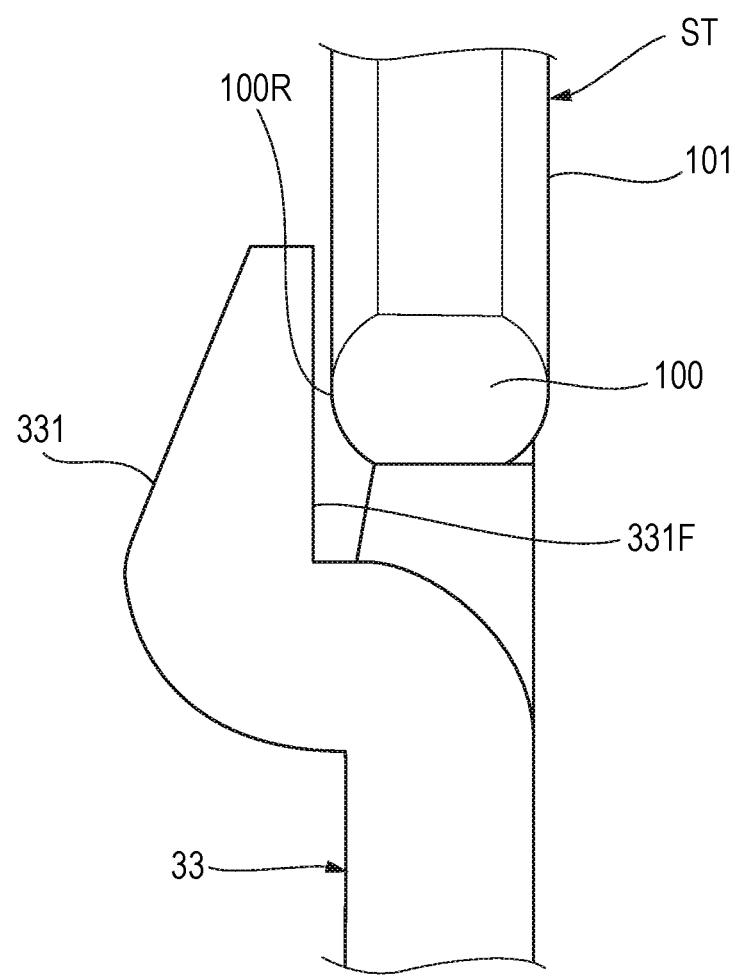
FIG. 26 is a cross-sectional view taken along a line XXVI-XXVI in FIG. 25.

FIG. 25 is a perspective view showing a staple guide portion 331 according to a third embodiment of the present invention. FIG. 26 is a cross-sectional view taken along a line XXVI-XXVI in FIG. 25. The third embodiment is different from the first embodiment in that the staple guide portion 331 is provided in the staple driver 32 but not in the staple magazine unit 22.

As shown in FIG. 25, the staple driver 32 includes a striking portion 33 that is abutted with the crown portion 100 of the staple ST and pushes out the staple ST, and the staple guide portion 331 that extends from the striking portion 33. The staple guide portion 331 has a wall surface 331F that faces a rear surface 100R of a leading staple ST.

According to the third embodiment, similarly to the first embodiment, the staple can be prevented from falling over at the time of being struck. Further, according to the third embodiment, the manufacturing costs can be reduced since the number of components is reduced as compared with that of the first embodiment.

The embodiments described above are for facilitating understanding of the present invention and are not to be interpreted as limiting the present invention. The elements included in the embodiments and their arrangements, materials, conditions, shapes, sizes, and the like are not limited to those illustrated, and can be appropriately changed. Further, it is possible to partially replace or combine the configurations shown in different embodiments. For example, although the staple ST is used as a means for binding both ends of a tape loop, the present invention is not limited thereto, and the tape loop may be bound by another means.

According to an aspect of the present invention, a binding machine, includes: a staple accommodating portion including a base end portion and a front end portion on an opposite side of the staple accommodating portion from the base end portion, the staple accommodating portion being configured to accommodate a U-shaped staple including a crown portion and a pair of leg portions at least at the front end portion with the crown portion facing downward; a staple driver located below the front end portion of the staple accommodating portion, movable relative to the staple accommodating portion from below to above in the staple accommodating portion, and configured to push the staple located at the front end portion upward while pushing the crown portion of the staple; a clincher provided at a position above the front end portion of the staple accommodating portion and facing the staple driver, and configured to be abutted against the pair of leg portions of the staple pushed out in a process of the staple driver moving upward from below so as to fold the pair of leg portions; and a staple guide portion adjacent to the staple in the staple accommodating portion and configured to support the crown portion of the staple from a side near the base end portion of the crown portion in a process of the staple being pushed out.

The staple guide portion may have an extending portion that extends to an inside of the staple accommodating portion.

The extending portion may have an non-supporting portion, which is spaced apart from the crown portion in a state where the staple guide portion supports the crown portion, in a surface of the extending portion facing the front end portion.

The non-supporting portion may be a recess provided in the surface of the extending portion.

The extending portion may have at least one supporting portion configured to support the crown portion. The non-supporting portion may be provided at a position adjacent to the at least one supporting portion.

The at least one supporting portion may comprise a plurality of supporting portions, and the non-supporting portion may be located between the plurality of support portions.

The plurality of supporting portions may be provided along a movement trajectory of the crown portion pushed by the staple driver toward the clincher, and the non-supporting portion may be provide with a predetermined distance from the movement trajectory.

The plurality of supporting portions may be respectively provided at both end portions of the extending portion in a width direction of the staple accommodating portion, and the non-supporting portion may be provided between the plurality of supporting portions.

The staple accommodating portion may have: a bottom wall portion extending along the crown portion of the accommodated staple, and a pair of side wall portions extending from the bottom wall portion and along the pair of leg portions of the staple respectively, and the staple guide portion may be provided to cross over the pair of side wall portions, and the extending portion may be located between the pair of leg portions of the staple.

The staple driver may include a striking portion configured to be abutted against the crown portion of the staple so as to push the staple, and the staple guide portion may have a wall surface that extends from the striking portion, and faces a rear surface of a leading staple struck by the striking portion and separated from other staples.

The binding machine may further include: a main handle, a tape being able to be pulled out form the front end portion of the main handle; and a clincher arm rotatably attached to the main arm so as to move toward and away from the main handle. The staple accommodating portion may be rotatably attached to the main handle. The staple driver may be disposed between the staple accommodating portion and the main handle. The clincher may be attached to a clincher arm.

The clincher arm: may include a tape gripping mechanism configured to grip the tape located in the front end portion of the main handle when performing first rotation to move toward the main handle, and may be configured to, when performing second rotation to move toward the main handle again after rotating so as to move away from the main handle in a direction opposite to the first rotation in a state where the first rotation is performed and the tape is gripped, bend the pair of leg portions of the staple pushed out from the staple accommodating portion by the staple driver.

According to the present invention as described above, there is provided a binding machine capable of preventing a staple from falling over at a time of staple striking.

What is claimed is:

1. A binding machine, comprising:
a staple accommodating portion including a base end portion and a front end portion on an opposite side of the staple accommodating portion from the base end portion, the staple accommodating portion being configured to accommodate a U-shaped staple including a crown portion and a pair of leg portions at least at the front end portion with the crown portion facing downward;
a staple driver located below the front end portion of the staple accommodating portion, movable relative to the staple accommodating portion from below to above in the staple accommodating portion, and configured to push the staple located at the front end portion upward while pushing the crown portion of the staple;
a clincher provided at a position above the front end portion of the staple accommodating portion and facing the staple driver, and configured to be abutted against the pair of leg portions of the staple pushed out in a process of the staple driver moving upward from below so as to fold the pair of leg portions;
a staple guide portion adjacent to the staple in the staple accommodating portion and configured to support the crown portion from a side of the crown portion facing the base end portion of the staple accommodating portion in a process of the staple being pushed out; and
a clincher guide located at the front end portion of the staple accommodating portion and forming a front wall surface of the staple accommodating portion, wherein
the staple guide portion is attached to the clincher guide to be fixed in position with respect to the front wall surface formed by the clincher guide, and has an extending portion that extends to an inside of the staple accommodating portion and a through hole into which the front end portion of the staple accommodating portion is inserted.

2. The binding machine according to claim 1, wherein the extending portion has a non-supporting portion, which is spaced apart from the crown portion in a state where the staple guide portion supports the crown portion, in a surface of the extending portion facing the front end portion.

3. The binding machine according to claim 2, wherein the non-supporting portion is a recess provided in the surface of the extending portion.

4. The binding machine according to claim 3, wherein the extending portion has at least one supporting portion configured to support the crown portion, and
the non-supporting portion is provided at a position adjacent to the at least one supporting portion.

5. The binding machine according to claim 4, wherein the at least one supporting portion comprises a plurality of supporting portions, and
the non-supporting portion is located between the plurality of support portions.

6. The binding machine according to claim 5, wherein the plurality of supporting portions are provided along a movement trajectory of the crown portion pushed by the staple driver toward the clincher, and
the non-supporting portion is provided with a predetermined distance from the movement trajectory.

7. The binding machine according to claim 6, wherein the plurality of supporting portions are respectively provided at both end portions of the extending portion in a width direction of the staple accommodating portion, and
the non-supporting portion is provided between the plurality of supporting portions.

8. The binding machine according to claim 5, wherein the plurality of supporting portions are respectively provided at both end portions of the extending portion in a width direction of the staple accommodating portion, and
the non-supporting portion is provided between the plurality of supporting portions.

9. The binding machine according to claim 4, wherein the at least one supporting portion is provided along a movement trajectory of the crown portion pushed by the staple driver toward the clincher, and
the non-supporting portion is provided with a predetermined distance from the movement trajectory.

10. The binding machine according to claim 9, wherein the at least one supporting portion comprises a plurality of supporting portions,
the plurality of supporting portions are respectively provided at both end portions of the extending portion in a width direction of the staple accommodating portion, and
the non-supporting portion is provided between the plurality of supporting portions.

11. The binding machine according to claim 2, wherein the extending portion has at least one supporting portion configured to support the crown portion, and
the non-supporting portion is provided at a position adjacent to the at least one supporting portion.

12. The binding machine according to claim 11, wherein the at least one supporting portion comprises a plurality of supporting portions, and
the non-supporting portion is located between the plurality of support portions.

13. The binding machine according to claim 12, wherein the plurality of supporting portions are provided along a movement trajectory of the crown portion pushed by the staple driver toward the clincher, and
the non-supporting portion is provided with a predetermined distance from the movement trajectory.

14. The binding machine according to claim 13, wherein the plurality of supporting portions are respectively provided at both end portions of the extending portion in a width direction of the staple accommodating portion, and
the non-supporting portion is provided between the plurality of supporting portions.

15. The binding machine according to claim 12, wherein the plurality of supporting portions are respectively provided at both end portions of the extending portion in a width direction of the staple accommodating portion, and
the non-supporting portion is provided between the plurality of supporting portions.

16. The binding machine according to claim 11, wherein the at least one supporting portion provided along a movement trajectory of the crown portion pushed by the staple driver toward the clincher, and
the non-supporting portion is provided with a predetermined distance from the movement trajectory.

17. The binding machine according to claim 16, wherein the at least one supporting portion comprises a plurality of supporting portions, the plurality of supporting portions are respectively provided at both end portions of the extending portion in a width direction of the staple accommodating portion, and the non-supporting portion is provided between the plurality of supporting portions.

18. The binding machine according to claim 1, wherein the staple accommodating portion has:
    a bottom wall portion extending along the crown portion of the accommodated staple, and
    a pair of side wall portions extending from the bottom wall portion and along the pair of leg portions of the staple respectively, and
the staple guide portion is provided to cross over the pair of side wall portions, and the extending portion is located between the pair of leg portions of the staple.

19. The binding machine according to claim 1, wherein
the staple driver includes a striking portion configured to be abutted against the crown portion of the staple so as to push the staple, and
the staple guide portion has a wall surface that extends from the striking portion, and faces a rear surface of a leading staple struck by the striking portion and separated from other staples.

20. The binding machine according to claim 1, further comprising:
    a main handle, a tape being able to be pulled out from the front end portion of the main handle; and
    a clincher arm rotatably attached to the main arm so as to move toward and away from the main handle, wherein
the staple accommodating portion is rotatably attached to the main handle,
the staple driver is disposed between the staple accommodating portion and the main handle, and
the clincher is attached to a clincher arm.

21. The binding machine according to claim 20, wherein the clincher arm:
    includes a tape gripping mechanism configured to grip the tape located in the front end portion of the main handle when performing first rotation to move toward the main handle, and
    is configured to, when performing second rotation to move toward the main handle again after rotating so as to move away from the main handle in a direction opposite to the first rotation in a state where the first rotation is performed and the tape is gripped, bend the pair of leg portions of the staple pushed out from the staple accommodating portion by the staple driver.

* * * * *